United States Patent [19]

Magee et al.

[11] Patent Number: 5,771,383
[45] Date of Patent: Jun. 23, 1998

[54] SHARED MEMORY SUPPORT METHOD AND APPARATUS FOR A MICROKERNEL DATA PROCESSING SYSTEM

[75] Inventors: James Michael Magee, Lake Worth; Freeman L. Rawson, III, Boca Raton, both of Fla.; Christopher Dean Youngworth, Savoy, Ill.

[73] Assignee: International Business Machines Corp., Armonk, N.Y.

[21] Appl. No.: 800,762

[22] Filed: Feb. 13, 1997

Related U.S. Application Data

[63] Continuation of Ser. No. 364,870, Dec. 27, 1994, abandoned.
[51] Int. Cl.⁶ ................................................. G06F 9/00
[52] U.S. Cl. ........................ 395/680; 395/670; 395/682
[58] Field of Search ................................. 395/680, 682, 395/673, 670, 674

[56] References Cited

U.S. PATENT DOCUMENTS

| 5,452,447 | 9/1995 | Nelson et al. | 395/650 |
| 5,481,719 | 1/1996 | Ackerman et al. | 395/700 |
| 5,485,626 | 1/1996 | Lawlor et al. | 395/650 |

OTHER PUBLICATIONS

"Subcontract; A Flexible base for Distributed Programming" Graham Hamilton et al, Proceedings of the 14th Symposium on Operating System 1993.
Mike Accetta, et al., "MACH: A New Kernel Foundation for UNIX Development", Proceedings of the Summer 1986 USENIX Conference, Atlanta, Georgia.
David Golub, et al., "UNIX as an Application Program", Proceedings of the Summer 1990 USENIX Conference, Anaheim, California.
David L. Black, et al., "Microkernel Operating System Architecture and MACH", USENIX Association, pp. 11–30, Apr. 27, 1992.

James M. Phelan, et al., An OS/2 Personality on MACH, MACH II Symposium, USENIX Association, Apr. 19–21, 1993, Sante Fe, New Mexico.
Michel Gien, "Micro–Kernel Design" *UNIX Review*, vol. 8, No. 11, pp. 58–63.
Michel Gien, "Next Generation Operating Systems Architecture", Lecture Notes in Computer Science, Operating Systems of the 90s and Beyond–International Workshop, A. Karshmer, et al. Eds., Dagstuhl Castle, Germany, pp. 227–232, Jul. 8–12, 1991.
Richard Rashid, "A Catalyst for Open Systems", *Datamation*, vol. 35, No. 10, pp. 32–33, May 15, 1989.
Allan Bricker, et al., "Architectural Issues in Microkernel–based operating systems: the CHORUS Experience," *CHORUS*, vol. 14, No. 6, pp. 347–357, Jul./Aug. 1991.
Robbert van Renesse, et al., "Short Overview of Amoeba", USENIX Association, Apr. 27, 1992, Seattle, Washington.
David L. Cohn, et al., "Basing Micro–Kernel Abstractions on High–Level Language Models", Open Forum '92, The Pan–European Open Systems Event, Proceedings of the Technical Conference, Utrecht, 23–27 Nov., 1992.
Gerald Malan, et al., "DOS as a Mach 3.0 Application", USENIX Association, Nov. 20–22, 1991, Monterey, California.
Joseph Boyken, et al., *Programming Under MACH*, Addison–Wesley Publishing Company, Incorporated, 1993.

*Primary Examiner*—Alvin E. Oberley
*Assistant Examiner*—Majid A. Banankhah
*Attorney, Agent, or Firm*—John E. Hoel; Mark Walker

[57] ABSTRACT

A data processing system and method provide for sharing a partition of a memory in the system between a first task and thread and a second task and thread, so as to more efficiently enable adaptive sharing of data for local tasks or alternately copying of data into I/O buffers for remote tasks. The system and method automatically determine whether sharing has been established between two local tasks and if not, the system and method will adaptively copy data for messages to be transferred between the tasks.

18 Claims, 16 Drawing Sheets

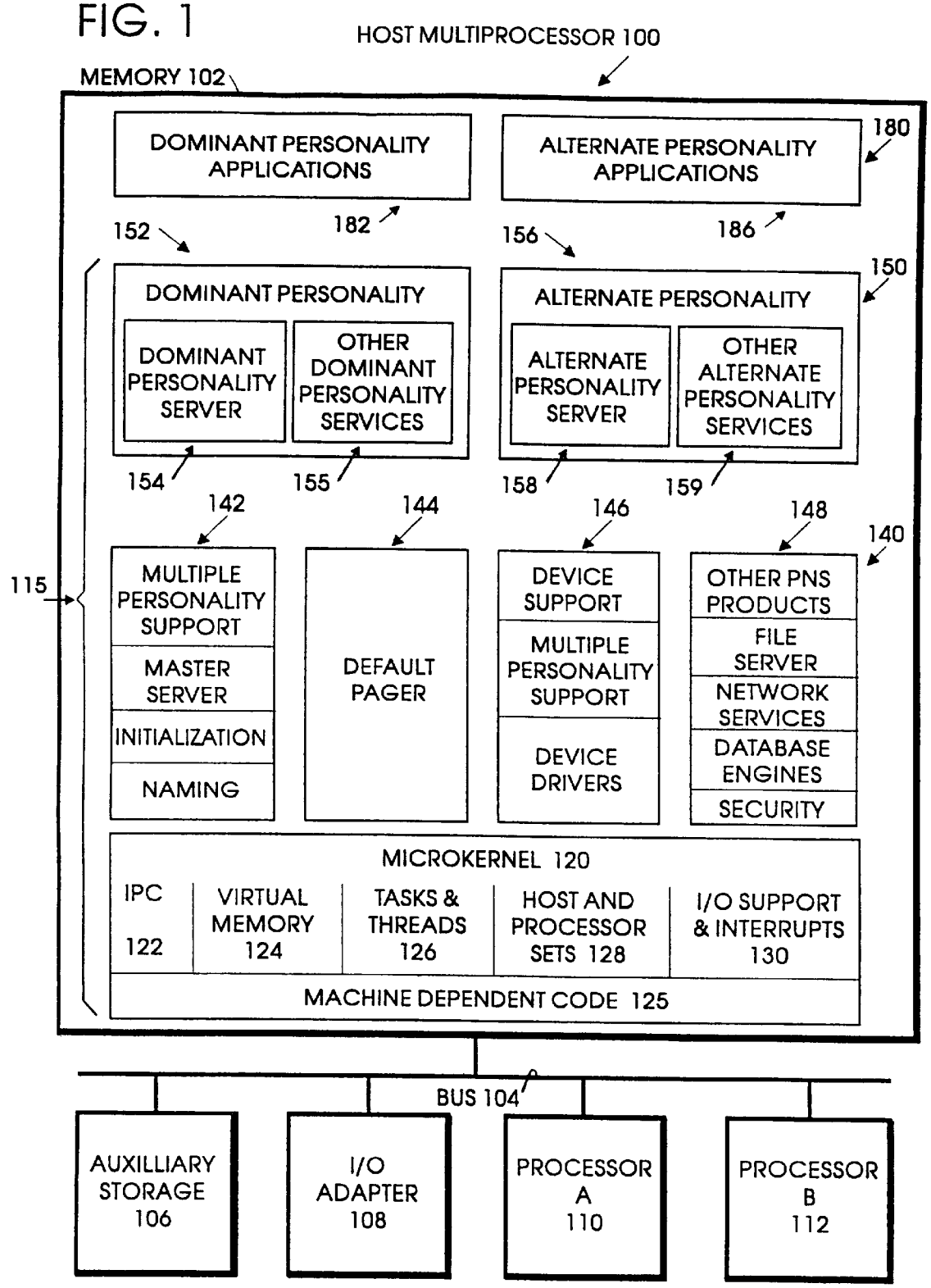

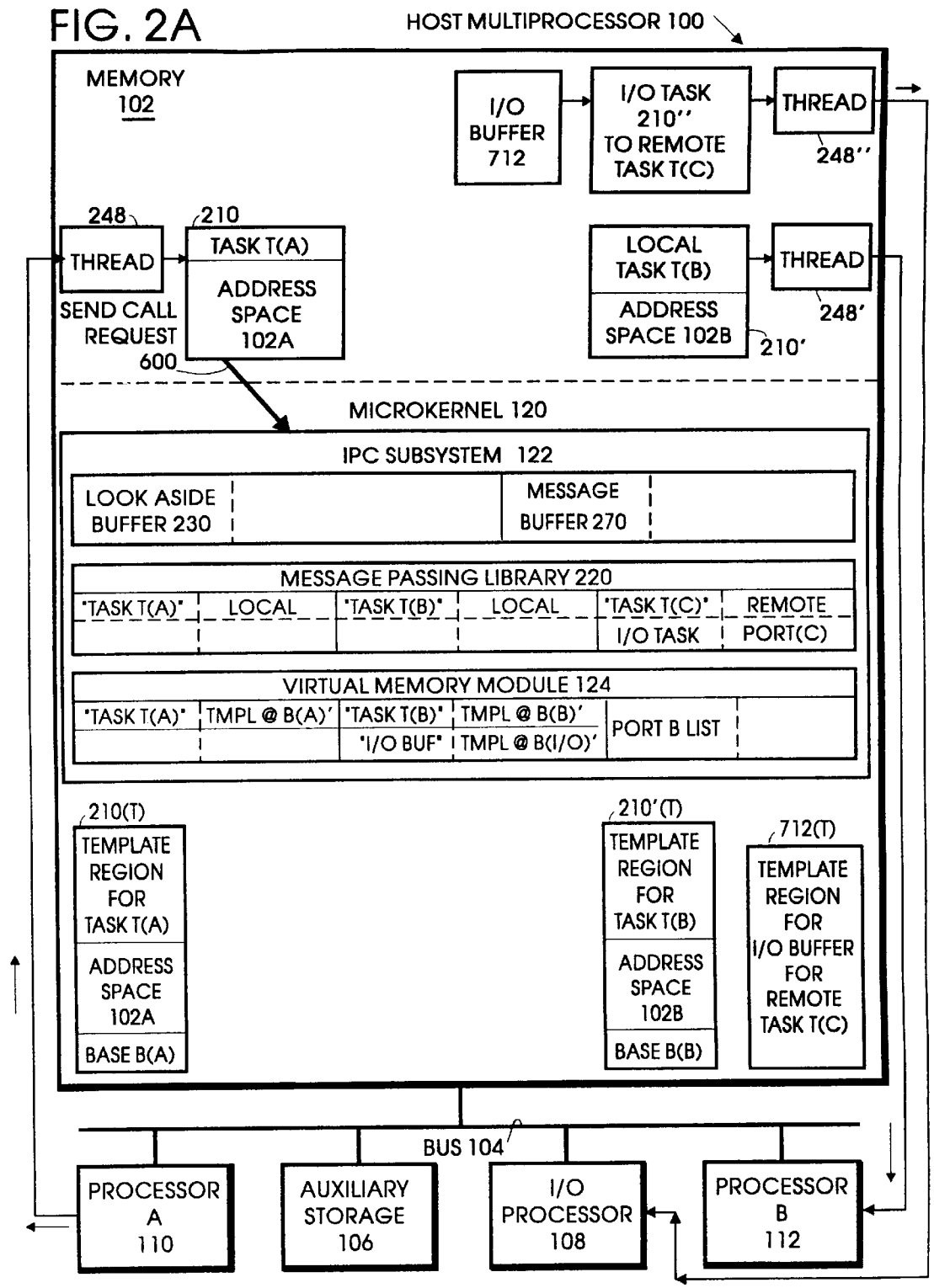

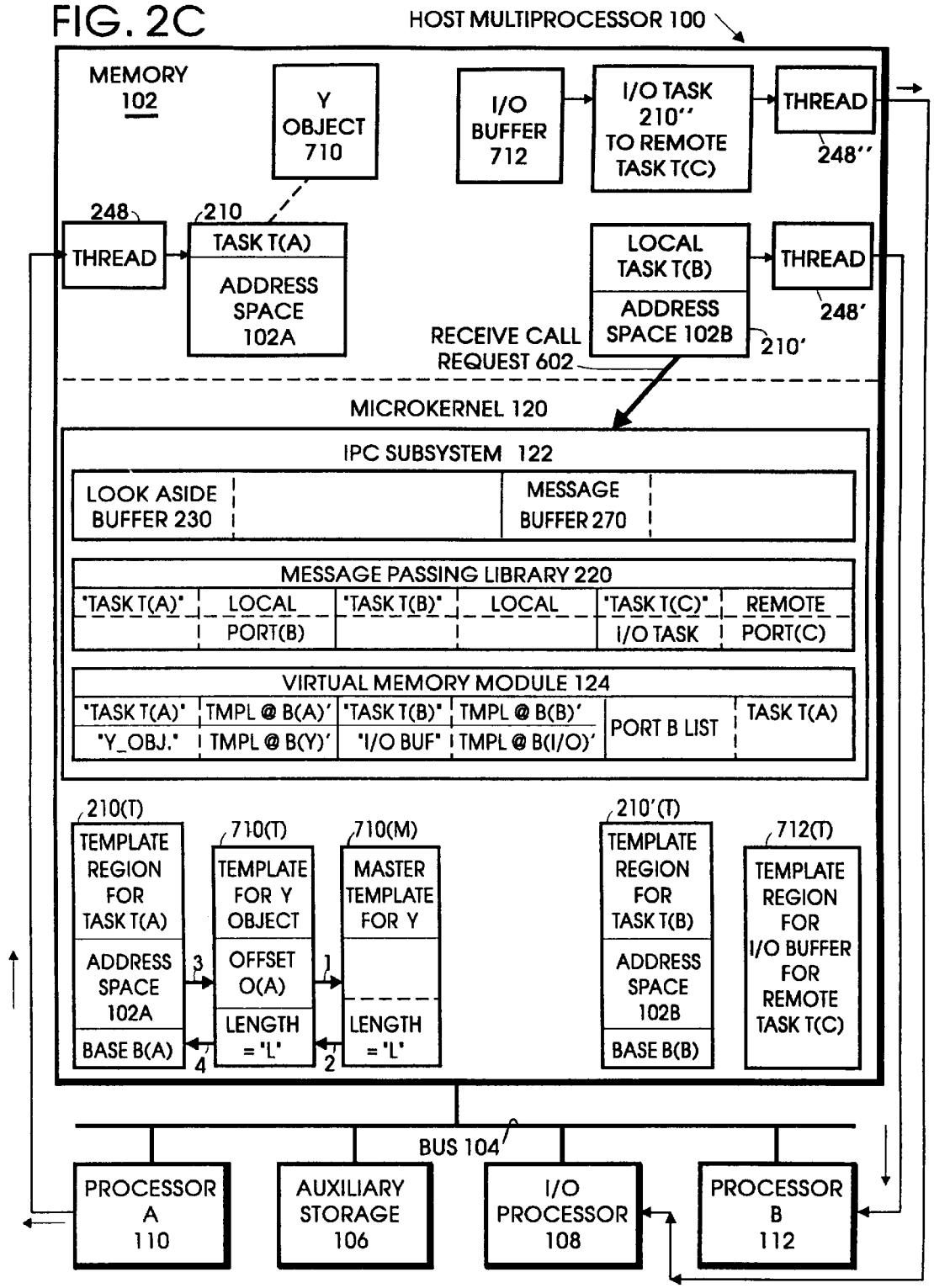

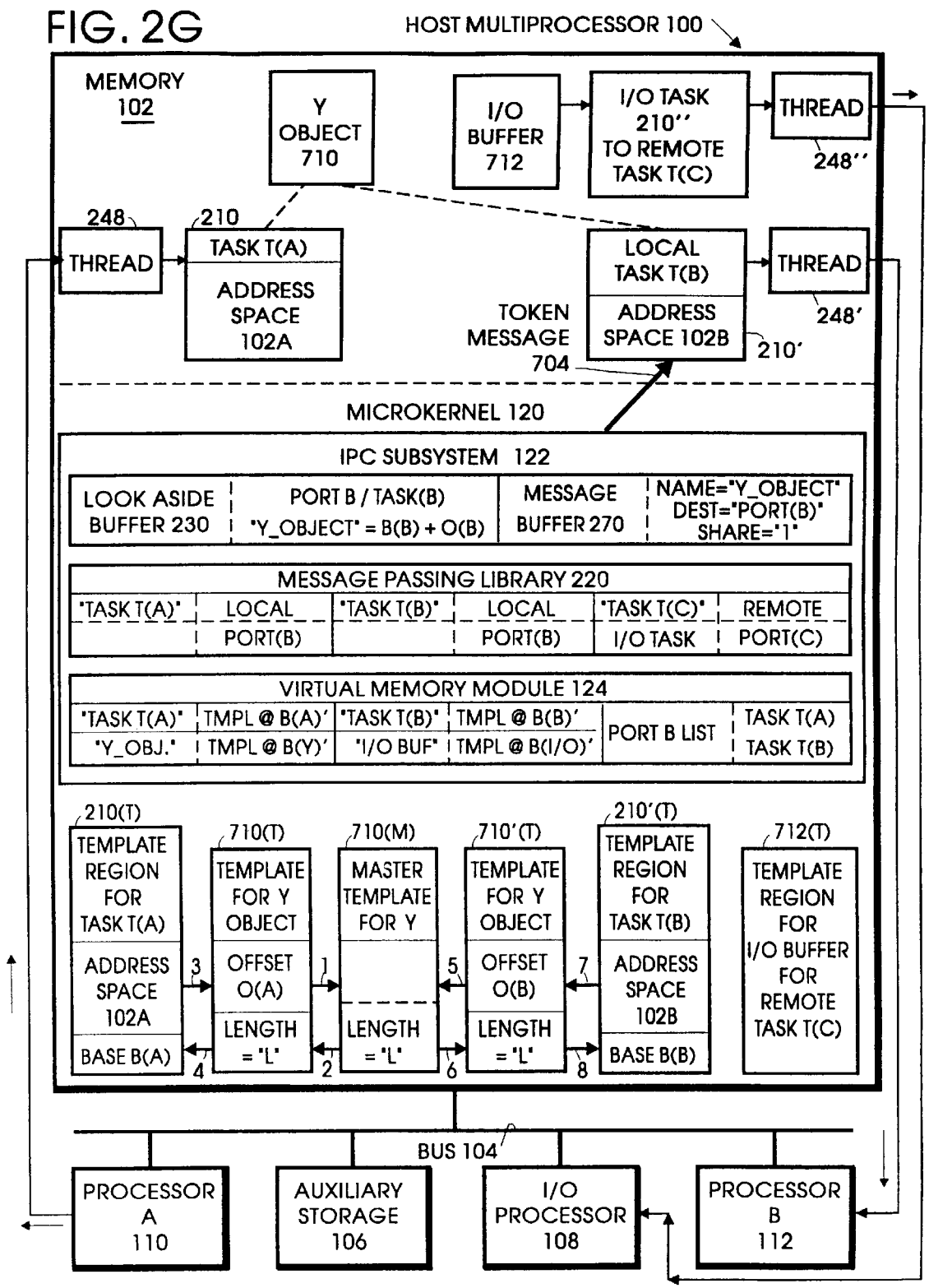

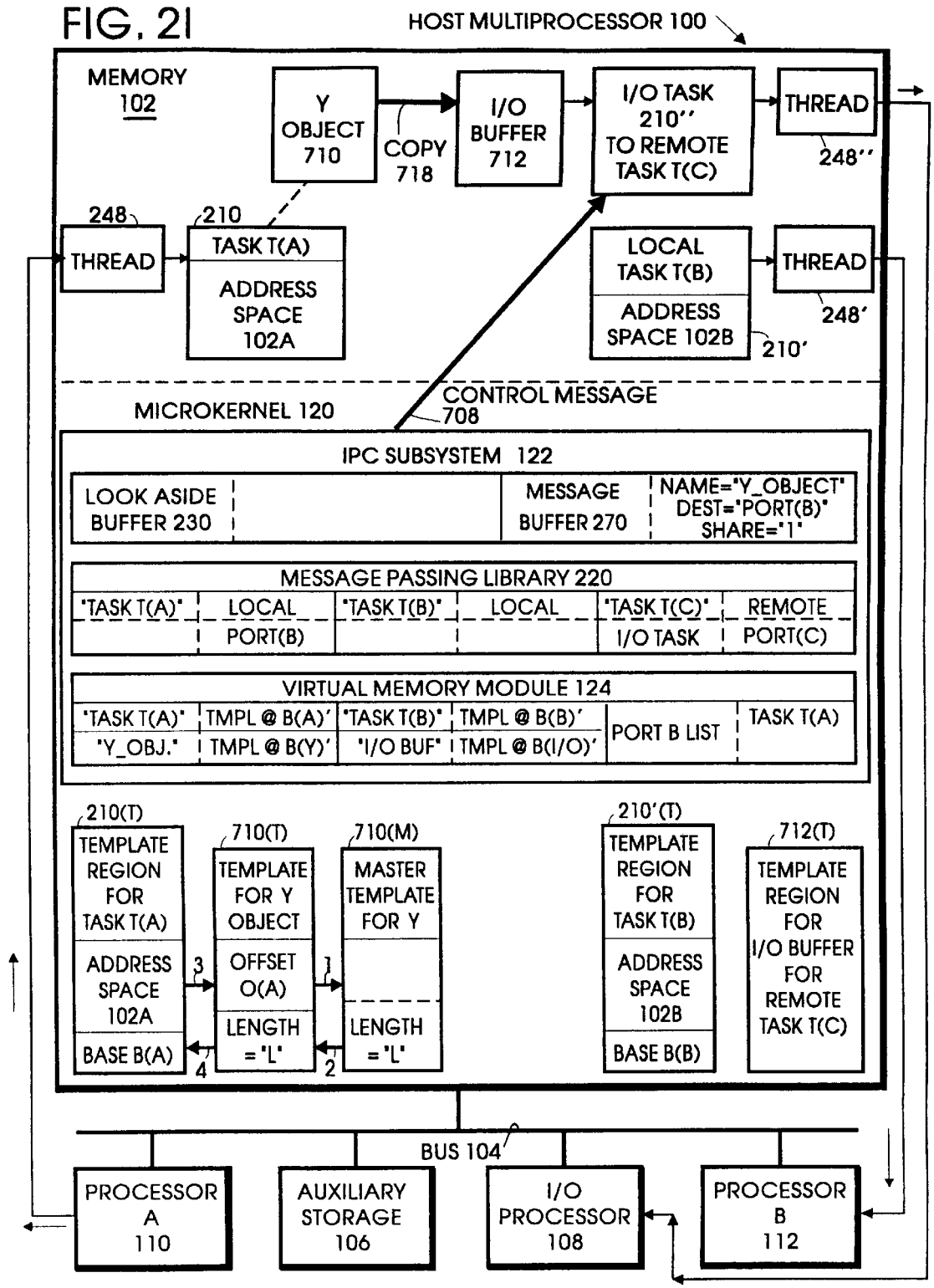

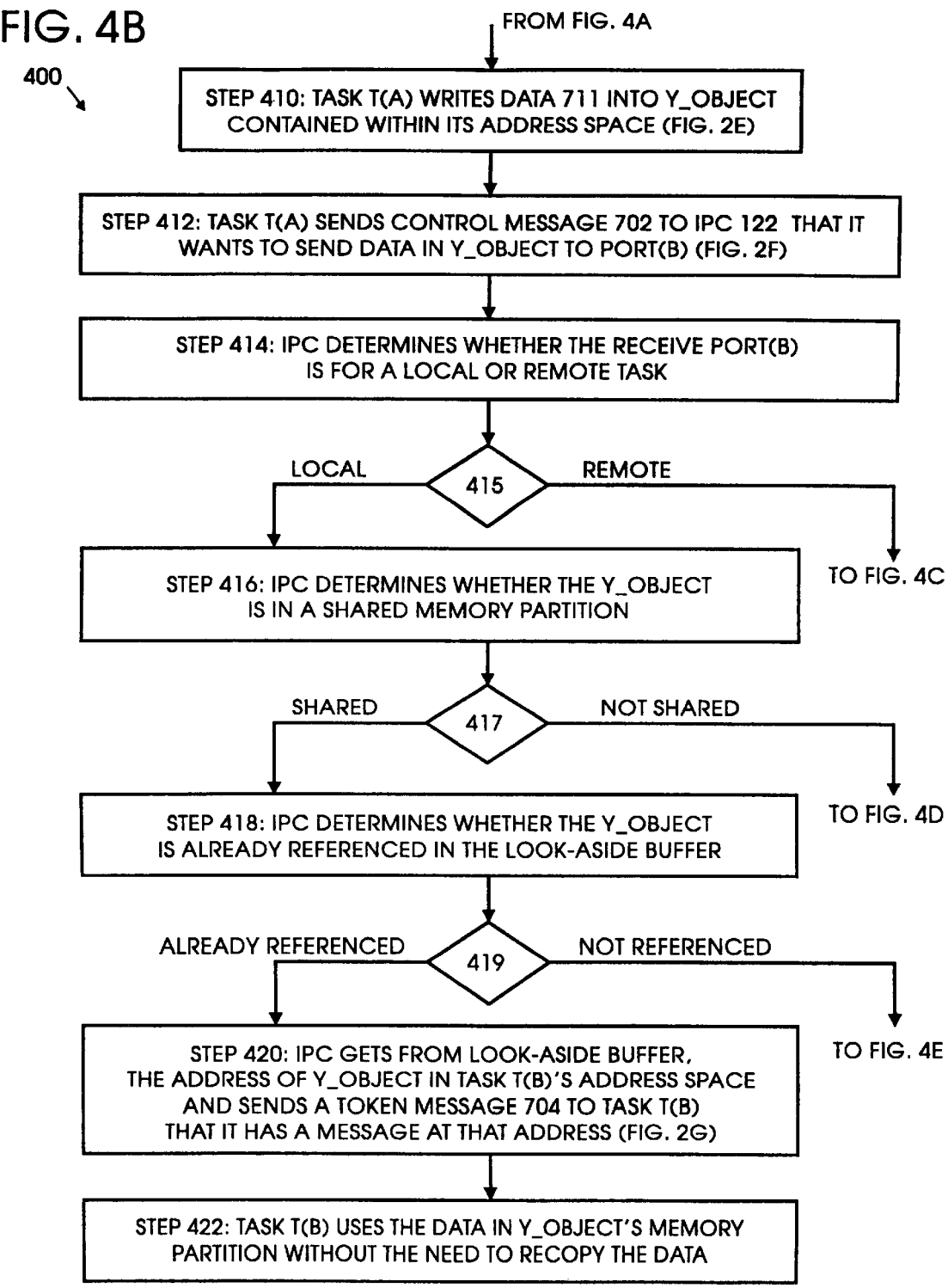

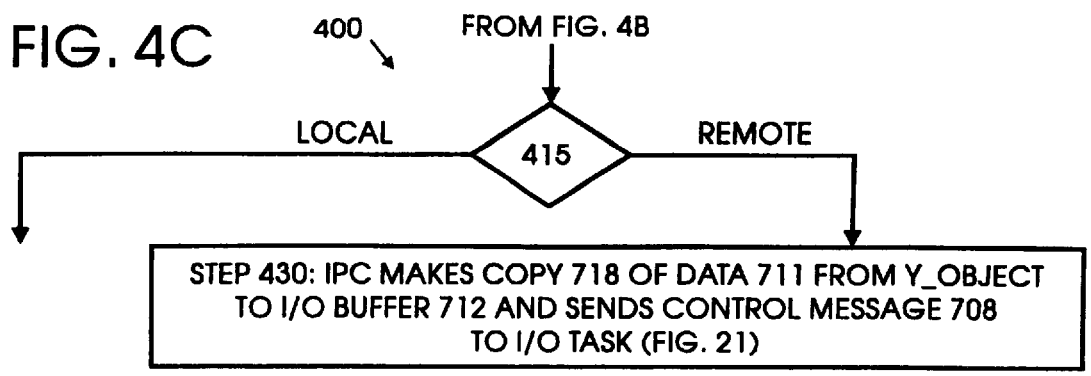
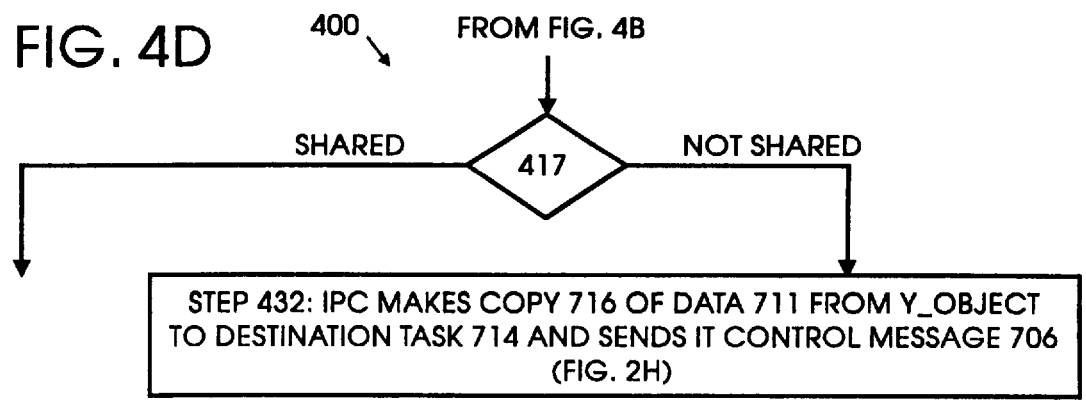
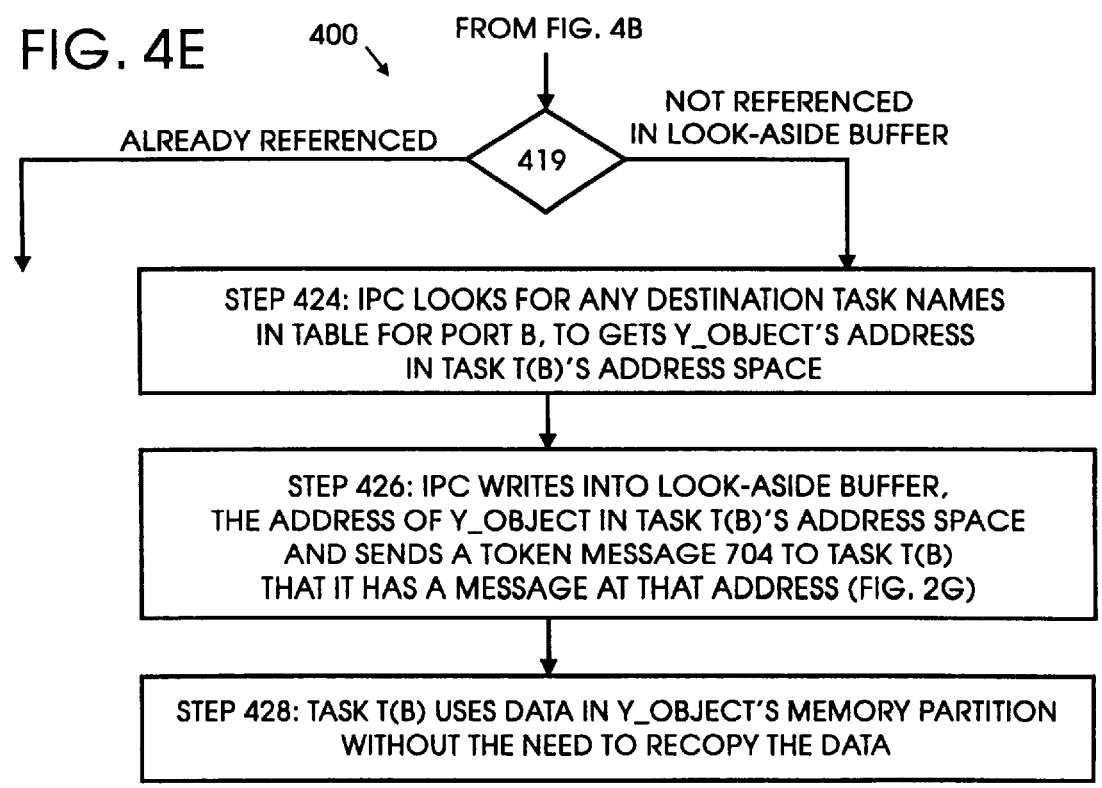

SHARED MEMORY SUPPORT METHOD AND APPARATUS FOR A MICROKERNEL DATA PROCESSING SYSTEM

This is a continuation of application Ser. No. 08/364,870, filed on Dec. 27, 1994, now abandoned.

FIELD OF THE INVENTION

The invention disclosed broadly relates to data processing systems and more particularly relates to improvements in operating systems for data processing systems.

RELATED PATENT APPLICATIONS

The invention disclosed herein is related to the co-pending U.S. Pat. Application by Guy G. Sotomayor, Jr., James M. Magee, and Freeman L. Rawson, III, which is entitled "METHOD AND APPARATUS FOR MANAGEMENT OF MAPPED AND UNMAPPED REGIONS OF MEMORY IN A MICROKERNEL DATA PROCESSING SYSTEM", Ser. No. 08/263,710 filed Jun. 21, 1994, IBM Docket Number BC9-94-053, assigned to the International Business Machines Corporation, and incorporated herein by reference.

The invention disclosed herein is also related to the co-pending U.S. patent application by James M. Magee, et al., which is entitled "CAPABILITY ENGINE METHOD AND APPARATUS FOR A MICROKERNEL DATA PROCESSING SYSTEM", Ser. No. 08/263,313, filed Jun. 21, 1994, IBM Docket Number BC9-94-071, assigned to the International Business Machines Corporation, and incorporated herein by reference.

The invention disclosed herein is also related to the co-pending U.S. patent application by James M. Magee, et al., which is entitled "TEMPORARY DATA METHOD AND APPARATUS FOR A MICROKERNEL DATA PROCESSING SYSTEM", Ser. No. 08/263,633, filed Jun. 21, 1994, IBM Docket Number BC9-94-076, assigned to the International Business Machines Corporation, and incorporated herein by reference.

The invention disclosed herein is also related to the co-pending U.S. patent application by James M. Magee, et al., which is entitled "MESSAGE CONTROL STRUCTURE REGISTRATION METHOD AND APPARATUS FOR A MICROKERNEL DATA PROCESSING SYSTEM", Ser. No. 08/263,703, filed Jun. 21, 1994, IBM Docket Number BC9-94-077, assigned to the International Business Machines Corporation, and incorporated herein by reference.

The invention disclosed herein is also related to the co-pending U.S. patent application by James M. Magee, et al., which is entitled "ANONYMOUS REPLY PORT METHOD AND APPARATUS FOR A MICROKERNEL DATA PROCESSING SYSTEM", Ser. No. 08/263,709, filed Jun. 21, 1994, IBM Docket Number BC9-94-080, assigned to the International Business Machines Corporation, and incorporated herein by reference.

The invention disclosed herein is also related to the co-pending U.S. patent application by Ram K. Gupta, Ravi Srinivasan, Dennis Ackerman, and Himanshu Desai, which is entitled "PAGE TABLE ENTRY MANAGEMENT METHOD AND APPARATUS FOR A MICROKERNEL DATA PROCESSING SYSTEM", Ser. No. 08/303,805, filed Sep. 9, 1994, IBM Docket Number BC9-94-073, assigned to the International Business Machines Corporation, and incorporated herein by reference.

The invention disclosed herein is also related to the co-pending U.S. patent application by Ram K. Gupta, Ravi Srinivasan, Dennis Ackerman, and Himanshu Desai, which is entitled "EXCEPTION HANDLING METHOD AND APPARATUS FOR A MICROKERNEL DATA PROCESSING SYSTEM", Ser. No. 08/303,796, filed Sep. 9, 1994, IBM Docket Number BC9-94-072, assigned to the International Business Machines Corporation, and incorporated herein by reference.

The invention disclosed herein is also related to the co-pending U.S. patent application by Hardeep Singh, Guy Sotomayor, Gary Barton, Freeman Rawson, Ching Yun Chao, and Charles Jung, which is entitled "BACKING STORE MANAGEMENT METHOD AND APPARATUS FOR A MICROKERNEL DATA PROCESSING SYSTEM", Ser. No. 08/303,851, filed Sep. 9, 1994, IBM Docket Number BC9-94-087, assigned to the International Business Machines Corporation, and incorporated herein by reference.

The invention disclosed herein is also related to the co-pending U.S. patent application by Ching Yun Chao, et al., which is entitled "MASTER SERVER PROGRAM LOADING METHOD AND APPARATUS FOR A MICROKERNEL DATA PROCESSING SYSTEM", Ser. No. 08/308,189, filed Sep. 19, 1994, IBM Docket Number BC9-94-074, assigned to the International Business Machines Corporation, and incorporated herein by reference.

The invention disclosed herein is also related to the co-pending U.S. patent application by Aziza Bushra Faruqi, et al., which is entitled "SEPARATION OF TRANSMISSION CONTROL METHOD AND APPARATUS FOR A MICROKERNEL DATA PROCESSING SYSTEM", Ser. No. 08/281,217, filed Jul. 27, 1994, IBM Docket Number BC9-94-081XX, assigned to the International Business Machines Corporation, and incorporated herein by reference.

BACKGROUND OF THE INVENTION

The operating system is the most important software running on a computer. Every general purpose computer must have an operating system to run other programs. Operating systems typically perform basic tasks, such as recognizing input from the keyboard, sending output to the display screen, keeping track of files and directories on the disc, and controlling peripheral devices such as disc drives and printers. For more complex systems, the operating system has even greater responsibilities and powers. It makes sure that different programs and users running at the same time do not interfere with each other. The operating system is also typically responsible for security, ensuring that unauthorized users do not access the system.

Operating systems can be classified as multi-user operating systems, multi-processor operating systems, multi-tasking operating systems, and real-time operating systems. A multiuser operating system allows two or more users to run programs at the same time. Some operating systems permit hundreds or even thousands of concurrent users. A multi-processing program allows a single user to run two or more programs at the same time. Each program being executed is called a process. Most multi-processing systems support more than one user. A multi-tasking system allows a single process to run more than one task. In common terminology, the terms multi-tasking and multi-processing are often used interchangeably even though they have slightly different meanings. Multi-tasking is the ability to execute more than one task at the same time, a task being a program. In multi-tasking, only one central processing unit is involved, but it switches from one program to another so quickly that it gives the appearance of executing all of the programs at the same time. There are two basic types of multi-tasking, preemptive and cooperative. In preemptive multi-tasking, the operating system parcels out CPU time slices to each program. In cooperative multi-tasking, each program can control the CPU for as long as it needs it. If a program is not using the CPU however, it can allow another program to use it temporarily. For example, the OS/2 (TM) and UNIX (TM) operating systems use preemptive multi-tasking, whereas the Multi-Finder (TM) operating system for Macintosh (TM) computers uses cooperative multi-tasking. Multi-processing refers to a computer system's ability to support more than one process or program at the same time. Multi-processing operating systems enable several programs to run concurrently. Multiprocessing systems are much more complicated than single-process systems because the operating system must allocate resources to competing processes in a reasonable manner. A real-time operating system responds to input instantaneously. General purpose operating systems such as DOS and UNIX are not real-time.

Operating systems provide a software platform on top of which application programs can run. The application programs must be specifically written to run on top of a particular operating system. The choice of the operating system therefore determines to a great extent the applications which can be run. For IBM compatible personal computers, example operating systems are DOS, OS/2 (TM), AIX (TM), and XENIX (TM).

A user normally interacts with the operating system through a set of commands. For example, the DOS operating system contains commands such as COPY and RENAME for copying files and changing the names of files, respectively. The commands are accepted and executed by a part of the operating system called the command processor or command line interpreter.

There are many different operating systems for personal computers such as CP/M (TM), DOS, OS/2 (TM), UNIX (TM), XENIX (TM), and AIX (TM). CP/M was one of the first operating systems for small computers. CP/M was initially used on a wide variety of personal computers, but it was eventually overshadowed by DOS. DOS runs on all IBM compatible personal computers and is a single user, single tasking operating system. OS/2, a successor to DOS, is a relatively powerful operating system that runs on IBM compatible personal computers that use the Intel 80286 or later microprocessor. OS/2 is generally compatible with DOS but contains many additional features, for example it is multi-tasking and supports virtual memory. UMX and UNIX-based AIX run on a wide variety of personal computers and work stations. UNIX and AIX have become standard operating systems for work stations and are powerful multi-user, multi-processing operating systems.

In 1981 when the IBM personal computer was introduced in the United States, the DOS operating system occupied approximately 10 kilobytes of storage. Since that time, personal computers have become much more complex and require much larger operating systems. Today, for example, the OS/2 operating system for the IBM personal computers can occupy as much as 22 megabytes of storage. Personal computers become ever more complex and powerful as time goes by and it is apparent that the operating systems cannot continually increase in size and complexity without imposing a significant storage penalty on the storage devices associated with those systems.

It was because of this untenable growth rate in operating system size, that the MACH project was conducted at the Carnegie Mellon University in the 1980's. The goal of that research was to develop a new operating system that would allow computer programmers to exploit modern hardware architectures emerging and yet reduce the size and the number of features in the kernel operating system. The kernel is the part of an operating system that performs basic functions such as allocating hardware resources. In the case of the MACH kernel, five programming abstractions were established as the basic building blocks for the system. They were chosen as the minimum necessary to produce a useful system on top of which the typical complex operations could be built externally to the kernel. The Carnegie Mellon MACH kernel was reduced in size in its release 3.0, and is a fully functional operating system called the MACH microkernel. The MACH microkernel has the following primitives: the task, the thread, the port, the message, and the memory object.

The task is the traditional UNIX process which is divided into two separate components in the MACH microkernel. The first component is the task, which contains all of the resources for a group of cooperating entities. Examples of resources in a task are virtual memory and communications ports. A task is a passive collection of resources; it does not run on a processor.

The thread is the second component of the UNIX process, and is the active execution environment. Each task may support one or more concurrently executing computations called threads. For example, a multi-threaded program may use one thread to compute scientific calculations while another thread monitors the user interface. A MACH task may have many threads of execution, all running simultaneously. Much of the power of the MACH programming model comes from the fact that all threads in a task share the task's resources. For instance, they all have the same virtual memory (VM) address space. However, each thread in a task has its own private execution state. This state consists of a set of registers, such as general purpose registers, a stack pointer, a program counter, and a frame pointer.

A port is the communications channel through which threads communicate with each other. A port is a resource and is owned by a task. A thread gains access to a port by virtue of belonging to a task. Cooperating programs may allow threads from one task to gain access to ports in another task. An important feature is that they are location transparent. This capability facilitates the distribution of services over a network without program modification.

The message is used to enable threads in different tasks to communicate with each other. A message contains collections of data which are given classes or types. This data can range from program specific data such as numbers or strings to MACH related data such as transferring capabilities of a port from one task to another.

A memory object is an abstraction which supports the capability to perform traditional operating system functions in user level programs, a key feature of the MACH microkernel. For example, the MACH microkernel supports virtual memory paging policy in a user level program. Memory objects are an abstraction to support this capability.

All of these concepts are fundamental to the MACH microkernel programming model and are used in the kernel itself. These concepts and other features of the Carnegie Mellon University MACH microkernel are described in the book by Joseph Boykin, et al, "Programming Under MACH", Addison Wessely Publishing Company, Incorporated, 1993.

Additional discussions of the use of a microkernel to support a UNIX personality can be found in the article by Mike Accetta, et al, "MACH: A New Kernel Foundation for UNIX Development", Proceedings of the Summer 1986 USENIX Conference, Atlanta, Georgia. Another technical article on the topic is by David Golub, et al, "UNIX as an Application Program", Proceedings of the Summer 1990 USENIX Conference, Anaheim, California.

The above cited, co-pending patent application by Guy G. Sotomayor, Jr., James M. Magee, and Freeman L. Rawson, III, describes the Microkernel System 115 shown in FIG. 1, which is a new foundation for operating systems. The Microkernel System 115 provides a concise set of kernel services implemented as a pure kernel and an extensive set of services for building operating system personalities implemented as a set of user-level servers. The Microkernel System 115 is made up of many server components that provide the various traditional operating system functions and that are manifested as operating system personalities. The Microkernel System 115 uses a client/server system structure in which tasks (clients) access services by making requests of other tasks (servers) through messages sent over a communication channel. Since the microkemel 120 provides very few services of its own (for example, it provides no file service), a microkernel 120 task must communicate with many other tasks that provide the required services. This raises the problem of how to manage the interprocess communication that must take place between the many clients and servers in the system, in a fast and efficient manner.

OBJECTS OF THE INVENTION

It is therefore an object of the invention to provide an improved microkernel architecture for a data processing system.

It is another object of the invention to provide to an improved microkernel architecture for a data processing system that is more simplified in its interprocess communication operations than has been capable in the prior art.

It is further object of the invention to provide an improved microkernel architecture for a data processing system, that has a faster and more efficient interprocess communication capability.

It is still a further object of the invention to provide an improved microkernel architecture for a data processing system, that has greater flexibility in the exchange of messages between tasks within a shared memory environment and between distributed data processors that do not share a common memory.

SUMMARY OF THE INVENTION

These and other objects, features and advantages are accomplished by the shared memory support method and apparatus for a microkernel data processing system disclosed herein.

The shared memory method and apparatus invention find application in a data processing system which includes a processor for executing stored program instructions in a memory for storing the program instructions. The program instructions describe a first task and thread and a second task and thread. The method of the invention shares a partition of the memory between the first task and thread and the second task and thread, thereby avoiding the necessity of recopying data to be shared between the two tasks.

The memory begins with an initialization stage which transfers a send call request from the first task and thread to an interprocess communications controller in the memory, to allocate a shared partition of the memory. The method continues by transferring a receive call request from the second task and thread to the interprocessor communications controller, to share the shared partition.

Later, when the first task and thread desire to transfer data to the second task and thread, the data is written from the first task and thread into the shared partition. The first task and thread then transfer a control message to the interprocess communications controller, to give notice of the data transferred to the shared partition.

The interprocess communications controller performs a first checking step to determine whether the second task and thread are local or remote. It then performs a second checking step to determine whether the second task and thread share the shared partition with the first task and thread. The interprocess communications controller then performs a third checking step to determine if the virtual address of the shared partition in the address space of the second task, has already been written into a look aside buffer in the memory. If the address is not already stored in the look aside buffer, then the interprocess communications controller writes that virtual address therein.

Then the interprocess communications controller transfers a token message to the second task and thread to give notice of the availability of data in the shared partition. In this manner, unnecessary copying of data is avoided in transferring the data from the first task and thread to the second task and thread.

The method further includes an alternate step of copying the data from the shared partition to an I/O buffer in the memory associated with an I/O task, if the first checking step determines that the destination task is not a local task.

The method further includes the alternate step of copying the data from the shared partition to a receive buffer associated with the second task and thread, if the second checking step determines that the second task and thread do not share the shared partition with the first task and thread.

The method further includes the step of checking the look aside buffer during a subsequent transfer of data from the shared partition and then transferring a subsequent token message to the destination task and thread, if the address for the shared partition is stored in the look aside buffer. That address would be the virtual address for the shared partition within the virtual address space for the destination task.

In this manner, unnecessary copying of data is avoided in the transfer of data between tasks and threads.

DESCRIPTION OF THE FIGURES

These and other objects features and advantages will be more fully appreciated with reference to the accompanying figures.

FIG. 1 is a functional block diagram of the Microkemel System 115 in the memory 102 of the host multiprocessor 100, showing how the microkernel and personality-neutral services 140 run multiple operating system personalities on a variety of hardware platforms.

FIGS. 2A to 2I hows an example of a shared memory object used in shared data messages.

FIGS. 4A, 4B, 4C, 4D, and 4E show a flow diagram of the method of the invention.

DISCUSSION OF THE PREFERRED EMBODIMENT Part A. The Microkernel System Microkernel Principles FIG. 1 is a functional block diagram of the Microkernel System 115, showing how the microkernel 120 and personality-neutral services 140 run multiple operating system personalities 150 on a variety of hardware platforms.

Figure 2B:
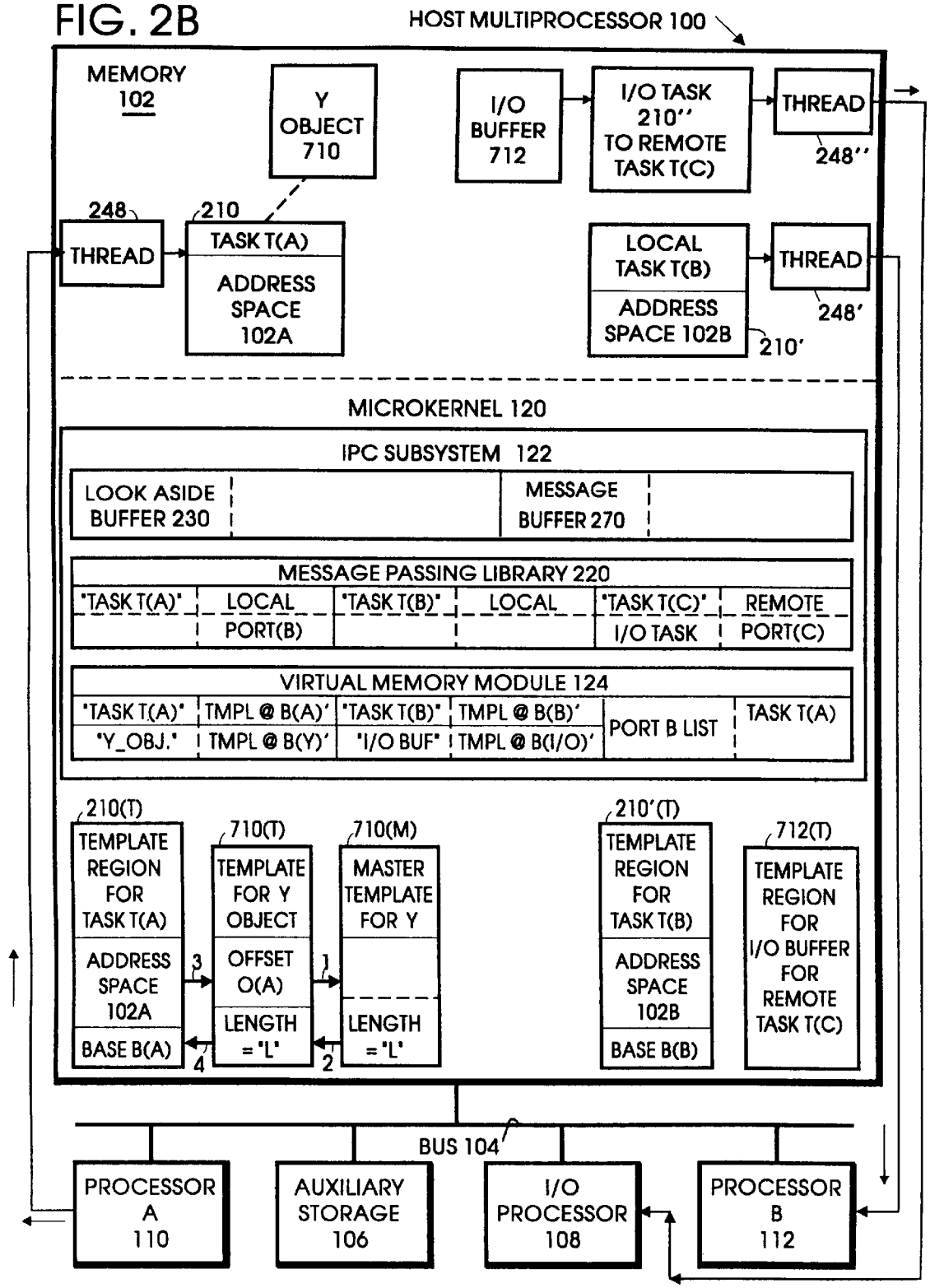

The host multi-processor 100 shown in FIG. 1 includes memory 102 connected by means of a bus 104 to an auxiliary storage 106 which can be for example a disc drive, a read only or a read/write optical storage, or any other bulk storage device. Also connected to the bus 104 is the I/O adaptor/processor 108 which in turn may be connected to a keyboard, a monitor display, a telecommunications adaptor, a local area network adaptor, a modem, multi-media interface devices, or other I/O devices. Also connected to the bus 104 is a first processor A, 110 and a second processor B, 112. The example shown in FIG. 1 is of a symmetrical multi-processor configuration wherein the two uni-processors 110 and 112 share a common memory address space 102. Other configurations of single or multiple processors can be shown as equally suitable examples. The processors can be, for example, an Intel 386 (TM) CPU, Intel 486 (TM) CPU, a Pentium (TM) processor, a Power PC (TM) processor, or other uni-processor devices.

The memory 102 includes the microkernel system 115 stored therein, which comprises the microkernel 120, the personality neutral services (PNS) 140, and the personality servers 150. The microkemel system 115 serves as the operating system for the application programs 180 stored in the memory 102.

An objective of the invention is to provide an operating system that behaves like a traditional operating system such as UNIX or OS/2. In other words, the operating system will have the personality of OS/2 or UNIX, or some other traditional operating system.

The microkernel 120 contains a small, message-passing nucleus of system software running in the most privileged state of the host multi-processor 100, that controls the basic operation of the machine. The microkernel system 115 includes the microkernel 120 and a set of servers and device drivers that provide personality neutral services 140. As the name implies, the personality neutral servers and device drivers are not dependent on any personality such as UNIX or OS/2. They depend on the microkernel 120 and upon each other. The personality servers 150 use the message passing services of the microkernel 120 to communicate with the personality neutral services 140. For example, UNIX, OS/2 or any other personality server can send a message to a personality neutral disc driver and ask it to read a block of data from the disc. The disc driver reads the block and returns it in a message. The message system is optimized so that large amounts of data are transferred rapidly by manipulating pointers; the data itself is not copied.

By virtue of its size and ability to support standard programming services and features as application programs, the microkernel 120 is simpler than a standard operating system. The microkernel system 115 is broken down into modular pieces that are configured in a variety of ways, permitting larger systems to be built by adding pieces to the smaller ones. For example, each personality neutral server 140 is logically separate and can be configured in a variety of ways. Each server runs as an application program and can be debugged using application debuggers. Each server runs in a separate task and errors in the server are confmed to that task.

FIG. 1 shows the microkernel 120 including the interprocess communications module (IPC) 122, the virtual memory module 124, tasks and threads module 126, the host and processor sets 128, I/O support and interrupts 130, and machine dependent code 125.

The personality neutral services 140 shown in FIG. 1 includes the multiple personality support 142 which includes the master server, initialization, and naming. It also includes the default pager 144. It also includes the device support 146 which includes multiple personality support and device drivers. It also includes other personality neutral products 148, including a file server, network services, database engines and security.

The personality servers 150 are for example the dominant personality 152 which can be, for example, a UNIX personality. It includes a dominant personality server 154 which would be a UNIX server, and other dominant personality services 155 which would support the UNIX dominant personality. An alternate dominant personality 156 can be for example OS/2. Included in the alternate personality 156 are the alternate personality server 158 which would characterize the OS/2 personality, and other alternate personality services for OS/2, 159.

Dominant personality applications 182 shown in FIG. 1, associated with the UNIX dominant personality example, are UNIX-type applications which would run on top of the UNIX operating system personality 152. The alternate personality applications 186 shown in FIG. 1, are OS/2 applications which run on top of the OS/2 alternate personality operating system 156.

FIG. 1 shows that the Microkemel System 115 carefully splits its implementation into code that is completely portable from processor type to processor type and code that is dependent on the type of processor in the particular machine on which it is executing. It also segregates the code that depends on devices into device drivers; however, the device driver code, while device dependent, is not necessarily dependent on the processor architecture. Using multiple threads per task, it provides an application environment that permits the use of multiprocessors without requiring that any particular machine be a multi-processor. On uniprocessors, different threads run at different times. All of the support needed for multiple processors is concentrated into the small and simple microkernel 120.

The Microkernel System 115 is a new foundation for operating systems. It provides a comprehensive environment for operating system development with the following features:

Support for multiple personalities

Extensible memory management

Interprocess communication

Multi-threading

Multi-processing

The Microkernel System 115 provides a concise set of kernel services implemented as a pure kernel and an extensive set of services for building operating system personalities implemented as a set of user-level servers.

Objectives of the Microkernel System 115 include the following:

Permit multiple operating system personalities to work together in harmony;

Provide common programming for low-level system elements, such as device drivers and file systems;

Exploit parallelism in both operating system and user applications;

Support large, potentially sparse address spaces with flexible memory sharing;

Allow transparent network resource access;

Be compatible with existing software environments, such as OS/2 and UNIX; and

Portable (to 32-bit and 64-bit platforms).

The Microkernel System 115 is based on the following concepts:

User mode tasks performing many traditional operating system functions (for example, file system and network access);

A basic set of user-level run time services for creating operating systems;

A simple, extensible communication kernel;

An object basis with communication channels as object references; and

A client/server programming model, using synchronous and asynchronous inter-process communication.

The basis for the Microkernel System 115 is to provide a simple, extensible communication kernel. It is an objective of the Microkernel System 115 to permit the flexible configuration of services in either user or kernel space with the minimum amount of function in the kernel proper. The kernel must provide other support besides task-to-task communication, including:

Management of points of control (threads);

Resource assignment (tasks);

Support of address spaces for tasks; and

Management of physical resources, such as physical memory, processors, interrupts, DMA channels, and clocks.

User mode tasks implement the policies regarding resource usage. The kernel simply provides mechanisms to enforce those policies.

Logically above the kernel is the Personality-Neutral services 140 (PNS) layer. The PNS provide a C runtime environment, including such basic constructs as string functions, and a set of servers which include:

Name Server - Allows a client to find a server Master Server - Allows programs to be loaded and started

Kernel Abstractions

One goal of the Microkernel System 115 is to minimize abstractions provided by the kernel itself, but not to be minimal in the semantics associated with those abstractions. Each of the abstractions provided has a set of semantics associated with it, and a complex set of interactions with the other abstractions. This can make it difficult to identify key ideas. The main kernel abstractions are:

Task - Unit of resource allocation, large access space and port right Thread - Unit of CPU utilization, lightweight (low overhead) Port - A communication channel, accessible only through the send/receive capabilities or rights Message - A collection of data objects Memory object - The internal unit of memory management

Tasks and Threads

The Microkernel System 115 does not provide the traditional concept of process because:

All operating system environments have considerable semantics associated with a process (such as user ID, signal state, and so on). It is not the purpose of the microkemel to understand or provide these extended semantics.

Many systems equate a process with an execution point of control. Some systems do not. The microkernel 120 supports multiple points of control separately from the operating system environment's process.

The microkernel provides the following two concepts:

Task

Thread

The kernel provides some memory management. Memory is associated with tasks. Memory objects are the means by which tasks take control over memory management. The Microkernel System 115 provides the mechanisms to support large, potentially sparse virtual address spaces. Each task has an associated address map that is maintained by the kernel and controls the translation of virtual address in the task's address space into physical addresses. As in virtual memory systems, the contents of the entire address space of any given task might not be completely resident in physical memory at the same time, and mechanisms must exist to use physical memory as a cache for the virtual address spaces of tasks. Unlike traditional virtual memory designs, the Microkernel System 115 does not implement all of the caching itself. It gives user mode tasks the ability to participate in these mechanisms. The PNS include a user task, the default pager 144, that provides paging services for memory.

Unlike other resources in the Microkernel System 115 virtual memory is not referenced using ports. Memory can be referenced only by using virtual addresses as indices into a particular task's address space. The memory and the associated address map that defmes a task's address space can be partially shared with other tasks. A task can allocate new ranges of memory within its address space, de-allocate them, and change protection on them. It can also specify inheritance properties for the ranges. A new task is created by specifying an existing task as a base from which to construct the address space for the new task. The inheritance attribute of each range of the memory of the existing task determines whether the new task has that range defmed and whether that range is virtually copied or shared with the existing task. Most virtual copy operations for memory are achieved through copy-on-write optimizations. A copy-on-write optimization is accomplished by protected sharing. The two tasks share the memory to be copied, but with read-only access. When either task attempts to modify a portion of the range, that portion is copied at that time. This lazy evaluation of memory copies is an important performance optimization performed by the Microkernel System 115 and important to the communication/memory philosophy of the system.

Any given region of memory is backed by a memory object. A memory manager task provides the policy governing the relationship between the image of a set of pages while cached in memory (the physical memory contents of a memory region) and the image of that set of pages when not cached (the abstract memory object). The PNS has a default memory manager or pager that provides basic non-persistent memory objects that are zero-filled initially and paged against system paging space.

Task to Task Communication

The Microkemel System 115 uses a client/server system structure in which tasks (clients) access services by making requests of other tasks (servers) through messages sent over a communication channel. Since the microkernel 120 provides very few services of its own (for example, it provides no file service), a microkernel 120 task must communicate with many other tasks that provide the required services. The communication channels of the interprocess communication (IPC) mechanism are called ports. A message is a collection of data, memory regions, and port rights. A port right is a name by which a task, that holds the right, names the port. A task can manipulate a port only if it holds the appropriate port rights. Only one task can hold the receive right for a port. This task is allowed to receive (read) messages from the port queue. Multiple tasks can hold send rights to the port that allow them to send (write) messages into the queue. A task communicates with another task by building a data structure that contains a set of data elements, and then performing a message-send operation on a port for which it holds a send right. At some later time, the task holding the receive right to that port performs a message-receive operation. Note: This message transfer is an asynchronous operation. The message is logically copied into the receiving task (possibly with copy-on-write optimizations). Multiple threads within the receiving task can be attempting to receive messages from a given port, but only one thread will receive any given message.

Architectural Model

The Microkernel System 115 has, as its primary responsibility, the provision of points of control that execute instructions within a framework. These points of control are called threads. Threads execute in a virtual environment. The virtual environment provided by the kernel contains a virtual processor that executes all of the user space accessible hardware instructions, augmented by user-space PNS and emulated instructions (system traps) provided by the kernel. The virtual processor accesses a set of virtualized registers and some virtual memory that otherwise responds as does the machine's physical memory. All other hardware resources are accessible only through special combinations of memory accesses and emulated instructions. Note that all resources provided by the kernel are virtualized.

Elements of the Personality Neutral Services (PNS)

The PNS 140 portion of the Microkernel System 115 consists of services built on the underlying microkernel 120. This provides some functions that the kernel itself depends on, as well as a basic set of user-level services for the construction of programs. These programs can serve requests from multiple operating system personality clients and are used to construct the operating system personalities themselves. In addition, there is an ANSI C run time environment for the construction of PNS programs in standard C and some supplemental functions that have definitions taken from the POSIX standard. Besides the libraries that define the PNS themselves, there are many libraries that exist within the PNS that are a part of the microkernel proper. These libraries represent the interfaces that the microkernel exports and the support logic for the Message Interface Generator (MIG) which is used with the Microkernel System's 115 interprocess communications facilities.

The structure of the PNS environment library hides the details of the implementation of each service from its callers. Some libraries, such as one of the C run time libraries, implement all of their functions as local routines that are loaded into the address space of the caller while other libraries consist of stubs that invoke the microkernel's IPC system to send messages to servers. This architecture permits the flexible implementation of function: servers can be replaced by other servers and services can be combined into single tasks without affecting the sources of the programs that use them. A key element of the PNS environment is that, it does not constitute a complete operating system. Instead, the PNS depend on the existence of a personality. The dominant personality 152, that is loaded first during system start-up, is the operating system personality which provides the user interface on the system and provides services to its clients and to elements of the PNS. Thus, the dominant personality is a server of "last resort". The dominant personality implements whatever services are defined by the PNS libraries but are not implemented by another server.

The microkernel 120 is also dependent on some elements of the PNS. There are cases when it sends messages to personality-neutral servers to complete internal kernel operations. For example, in resolving a page fault, the microkernel 120 may send a message to the default pager 144. The default pager 144 then reads in the page that the kernel needs from a hard disk. Although the page fault is usually being resolved on behalf of a user task, the kernel is the sender of the message.

Run Time

The PNS run time provides a set of ANSI C and POSIX libraries that are used to support a standard C programming environment for programs executing in this environment. The facilities include typical C language constructs. Like all systems, the microkernel system 115 has, as its primary responsibility, the provision of points of control that execute instructions within a framework. In the microkernel 120, points of control are called threads. Threads execute in a virtual environment. The virtual environment provided by the microkernel 120 consists of a virtual processor that executes all of the user space accessible hardware instructions, augmented by emulated instructions (system traps) provided by the kernel; the virtual processor accesses a set of virtualized registers and some virtual memory that otherwise responds as does the machine's physical memory. All other hardware resources are accessible only through special combinations of memory accesses and emulated instructions. Note that all resources provided by the microkernel are virtualized.

Elements of the Kernel

The microkernel 120 provides an environment consisting of the elements described in the following list of Kernel Elements:

Thread:

An execution point of control. A thread is a lightweight entity. Most of the state pertinent to a thread is associated with its containing task.

Task:

A container to hold references to resources in the form of a port name space, a virtual address space, and a set of threads.

Security Token:

A security feature passed from the task to server, which performs access validations.

Port:

A unidirectional communication channel between tasks.

Port Set:

A set of ports which can be treated as a single unit when receiving a message.

Port Right:

Allows specific rights to access a port.

Port Name Space:

An indexed collection of port names that names a particular port right.

Message:

A collection of data, memory regions and port rights passed between two tasks.

Message Queue:

A queue of messages associated with a single port.

Virtual Address Space:

A sparsely populated, indexed set of memory pages that can be referenced by the threads within a task. Ranges of pages might have arbitrary attributes and semantics associated with them through mechanisms implemented by the kernel and external memory managers.

Abstract Memory Object:

An abstract object that represents the non-resident state of the memory ranges backed by this object. The task that implements this object is called a memory manager. The abstract memory object port is the port through which the kernel requests action of the memory manager.

Memory Object Representative:

The abstract representation of a memory object provided by the memory manager to clients of the memory object. The representative names the associated abstract memory object and limits the potential access modes permitted to the client.

Memory Cache Object:

A kernel object that contains the resident state of the memory ranges backed by an abstract memory object. It is through this object that the memory manager manipulates the clients' visible memory image.

Processor:

A physical processor capable of executing threads.

Processor Set:

A set of processors, each of which can be used to execute the threads assigned to the processor set.

Host:

The multiprocessor as a whole.

Clock:

A representation of the passage of time. A time value incremented at a constant frequency.

Many of these elements are kernel implemented resources that can be directly manipulated by threads. Each of these elements are discussed in detail in the paragraphs that follow. However, since some of their definitions depend on the definitions of others, some of the key concepts are discussed in simplified form so that a full discussion can be understood.

Threads

A thread is a lightweight entity. It is inexpensive to create and requires low overhead to operate. A thread has little state (mostly its register state). Its owning task bears the burden of resource management. On a multiprocessor it is possible for multiple threads in a task to execute in parallel. Even when parallelism is not the goal, multiple threads have an advantage because each thread can use a synchronous programming style, instead of asynchronous programming with a single thread attempting to provide multiple services.

A thread contains the following features:

1. a point of control flow in a task or a stream of instruction execution;

2. access to all of the elements of the containing task;

3. executes in parallel with other threads, even threads within the same task; and 4. minimal state for low overhead.

A thread is the basic computational entity. A thread belongs to only one task that defmes its virtual address space. To affect the structure of the address space, or to reference any resource other than the address space, the thread must execute a special trap instruction. This causes the kernel to perform operations on behalf of the thread, or to send a message to an agent on behalf of the thread. These traps manipulate resources associated with the task containing the thread. Requests can be made of the kernel to manipulate these entities: to create and delete them and affect their state. The kernel is a manager that provides resources (such as those listed above) and services. Tasks may also provide services, and implement abstract resources. The kernel provides communication methods that allow a client task to request that a server task (actually, a thread executing within it) provide a service. In this way, a task has a dual identity. One identity is that of a resource managed by the kernel, whose resource manager executes within the kernel. The second identity is that of a supplier of resources for which the resource manager is the task itself.

A thread has the following state:

1. Its machine state (registers, etc.), which change as the thread executes and which can also be changed by a holder of the kernel thread port;

2. A small set of thread specific port rights, identifying the thread's kernel port and ports used to send exception messages on behalf of the thread;

3. A suspend count, non-zero if the thread is not to execute instructions; and

4. Resource scheduling parameters.

A thread operates by executing instructions in the usual way. Various special instructions trap to the kernel, to perform operations on behalf of the thread. The most important of these kernel traps is the mach_msg_trap. This trap allows the thread to send messages to the kernel and other servers to operate upon resources. This trap is almost never directly called; it is invoked through the mach_msg library routine. Exceptional conditions, such as "floating point overflow" and "page not resident", that arise during the thread's execution, are handled by sending messages to a port. The port used depends on the nature of the condition. The outcome of the exceptional condition is determined by setting the thread's state and/or responding to the exception message. The following operations can be performed on a thread:

Creation and destruction;

Suspension and resumption (manipulating the suspend count);

Machine state manipulation;

Special port (such as exception port) manipulation; and

Resource (scheduling) control.

Tasks

A task is a collection of system resources. These resources, with the exception of the address space, are referenced by ports. These resources can be shared with other tasks if rights to the ports are so distributed.

Tasks provide a large, potentially sparse address space, referenced by machine address. Portions of this space can be shared through inheritance or external memory management. Note: A task has no life of its own. It contains threads which execute instructions. When it is said "a task Y does X" what is meant is "a thread contained within task Y does X". A task is an expensive entity. All of the threads in a task share everything. Two tasks share nothing without explicit action, although the action is often simple. Some resources such as port receive rights cannot be shared between two tasks. A task can be viewed as a container that holds a set of threads. It contains default values to be applied to its containing threads. Most importantly, it contains those elements that its containing threads need to execute, namely, a port name space and a virtual address space.

The state associated with a task is as follows:

The set of contained threads;

The associated virtual address space;

The associated port name space, naming a set of port rights, and a related set of port notification requests;

A security token to be sent with messages from the task;

A small set of task specific ports, identifying the task's kernel port, default ports to use for exception handling for contained threads, and bootstrap ports to name other services;

A suspend count, non-zero if no contained threads are to execute instructions;

Default scheduling parameters for threads; and

Various statistics, including statistical PC samples.

Tasks are created by specifying a prototype task which specifies the host on which the new task is created, and which can supply by inheritance various portions of its address space.

The following operations can be performed on a task:

Creation and destruction

Setting the security token

Suspension and resumption

Special port manipulation

Manipulation of contained threads

Manipulation of the scheduling parameters

Security Port

All tasks are tagged with a security token, an identifier that is opaque from the kernel's point of view. It encodes the identity and other security attributes of the task. This security token is included as an implicit value in all messages sent by the task. Trusted servers can use this sent token as an indication of the sender's identity for use in making access mediation decisions.

A task inherits the security token of its parent. Because this token is to be used as an un-forgeable indication of identity, privilege is required to change this token. This privilege is indicated by presenting the host security port.

A reserved value indicates the kernel's identity. All messages from the kernel carry the kernel identity, except exception messages, which carry the excepting task's identity.

Port

A port is a unidirectional communication channel between a client that requests a service and a server that provides the service. A port has a single receiver and potentially multiple senders. The state associated with a port is as follows:

Its associated message queue

A count of references (rights) to the port

Settable limits on the amount of virtual copy memory and port rights that can be sent in a message through the port.

Kernel services exist to allocate ports. All system entities other than virtual memory ranges are named by ports; ports are also created implicitly when these entities are created.

The kernel provides notification messages upon the death of a port upon request. With the exception of the task's virtual address space, all other system resources are accessed through a level of indirection known as a port. A port is a unidirectional communication channel between a client who requests service and a server who provides the service. If a reply is to be provided to such a service request, a second port must be used. The service to be provided is determined by the manager that receives the message sent over the port. It follows that the receiver for ports associated with kernel provided entities is the kernel. The receiver for ports associated with task provided entities is the task providing that entity. For ports that name task provided entities, it is possible to change the receiver of messages for that port to a different task. A single task might have multiple ports that refer to resources it supports. Any given entity can have multiple ports that represent it, each implying different sets of permissible operations. For example, many entities have a name port and a control port that is sometimes called the privileged port. Access to the control port allows the entity to be manipulated. Access to the name port simply names the entity, for example, to return information.

There is no system-wide name space for ports. A thread can access only the ports known to its containing task. A task holds a set of port rights, each of which names a (not necessarily distinct) port and which specifies the rights permitted for that port. Port rights can be transmitted in messages. This is how a task gets port rights. A port right is named with a port name, which is an integer chosen by the kernel that is meaningful only within the context (port name space) of the task holding that right. Most operations in the system consist of sending a message to a port that names a manager for the object being manipulated. In this document, this is shown in the form:

object->function which means that the function is invoked (by sending an appropriate message) to a port that names the object. Since a message must be sent to a port (right), this operation has an object basis. Some operations require two objects, such as binding a thread to a processor set. These operations show the objects separated by commas. Not all entities are named by ports, and this is not a pure object model. The two main non-port-right named entities are port names/rights themselves, and ranges of memory. Event objects are also named by task local IDs. To manipulate a memory range, a message is sent to the containing virtual address space named by the owning task. To manipulate a port name/right, and often, the associated port, a message is sent to the containing port name space named by the owning task. A subscript notation, object [id]->function is used here to show that an id is required as a parameter in the message to indicate which range or element of object is to be manipulated. The parenthetic notation, object (port)->function is used here to show that a privileged port, such as the host control port, is required as a parameter in the message to indicate sufficient privilege to manipulate the object in the particular way.

Port Sets

A port set is a set of ports that can be treated as a single unit when receiving a message. A mach_msg receive operation is allowed against a port name that either names a receive right, or a port set. A port set contains a collection of receive rights. When a receive operation is performed against a port set, a message is received from one of the ports in the set. The received message indicates from which member port it was received. It is not allowed to directly receive a message from a port that is a member of a port set. There is no concept of priority for the ports in a port set; there is no control provided over the kernel's choice of the port within the port set from which any given message is received.

Operations supported for port sets include:

Creation and deletion

Membership changes and membership queries

Port Rights

A port can only be accessed by using a port right. A port right allows access to a specific port in a specific way. There are three types of port rights as follow:

receive right - Allows the holder to receive messages from the associated port.

send right - Allows the holder to send messages to the associated port.

send-once right - Allows the holder to send a single message to the associated port. The port right self-destructs after the message is sent.

Port rights can be copied and moved between tasks using various options in the mach_msg call, and also by explicit command. Other than message operations, port rights can be manipulated only as members of a port name space. Port rights are created implicitly when any other system entity is created, and explicitly using explicit port creation.

The kernel will, upon request, provide notification to a port of one's choosing when there are no more send rights to a port. Also, the destruction of a send-once right (other than by using it to send a message) generates a send-once notification sent to the corresponding port. Upon request, the kernel provides notification of the destruction of a receive right.

Port Name Space

Ports and port rights do not have system-wide names that allow arbitrary ports or rights to be manipulated directly. Ports can be manipulated only through port rights, and port rights can be manipulated only when they are contained within a port name space. A port right is specified by a port name which is an index into a port name space. Each task has associated with it a single port name space.

An entry in a port name space can have the following four possible values:

MACH_PORT_NULL - No associated port right.

MACH_PORT_DEAD - A right was associated with this name, but theporttowhich the right referred has been destroyed.

A port right - A send-once, send or receive right for a port.

A port set name - A name which acts like a receive right, but that allows receiving from multiple ports.

Acquiring a new right in a task generates a new port name. As port rights are manipulated by referring to their port names, the port names are sometimes themselves manipulated. All send and receive rights to a given port in a given port name space have the same port name. Each send-once right to a given port have a different port name from any other and from the port name used for any send or receive rights held. Operations supported for port names include the following:

Creation (implicit in creation of a right) and deletion

Query of the associated type

Rename

Upon request, the kernel provides notification of a name becoming unusable.

Since port name spaces are bound to tasks, they are created and destroyed with their owning task.

Message

A message is a collection of data, memory regions and port rights passed between two entities. A message is not a system object in its own right. However, since messages are queued, they are significant because they can hold state between the time a message is sent and when it is received. This state consists of the of following:

Pure data

Copies of memory ranges

Port rights

Sender's security token

Message Queues

A port consists of a queue of messages. This queue is manipulated only through message operations (mach_msg) that transmit messages. The state associated with a queue is the ordered set of messages queued, and settable limit on the number of messages.

Virtual Address Space

A virtual address space defines the set of valid virtual addresses that a thread executing within the task owning the virtual address space is allowed to reference. A virtual address space is named by its owning task.

A virtual address space consists of a sparsely populated indexed set of pages. The attributes of individual pages can be set as desired. For efficiency, the kernel groups virtually contiguous sets of pages that have the same attributes into internal memory regions. The kernel is free to split or merge memory regions as desired. System mechanisms are sensitive to the identities of memory regions, but most user accesses are not so affected, and can span memory regions freely.

A given memory range can have distinct semantics associated with it through the actions of a memory manager. When a new memory range is established in a virtual address space, an abstract memory object is specified, possibly by default, that represents the semantics of the memory range, by being associated with a task (a memory manager) that provides those semantics.

A virtual address space is created when a task is created, and destroyed when the task is destroyed. The initial contents of the address space is determined from various options to the task_create call, as well as the inheritance properties of the memory ranges of the prototype task used in that of call.

Most operations upon a virtual address space name a memory range within the address space. These operations include the following:

Creating or allocating, and de-allocating a range

Copying a range

Setting special attributes, including "wiring" the page into physical memory to prevent eviction Setting memory protection attributes Setting inheritance properties Directly reading and writing ranges Forcing a range flush to backing storage Reserving a range (preventing random allocation within the range)

Abstract Memory Object

The microkernel allows user mode tasks to provide the semantics associated with referencing portions of a virtual address space. It does this by allowing the specification of an abstract memory object that represents the non-resident state of the memory ranges backed by this memory object. The task that implements this memory object and responds to messages sent to the port that names the memory object is called a memory manager.

The kernel should be viewed as using main memory as a directly accessible cache for the contents of the various memory objects. The kernel is involved in an asynchronous dialog with the various memory managers to maintain this cache, filling and flushing this cache as the kernel desires, by sending messages to the abstract memory object ports. The operations upon abstract memory objects include the following:

Initialization

Page reads

Page writes

Synchronization with force and flush operations

Requests for permission to access pages

Page copies

Termination

Memory Object Representative

The abstract memory object port is used by the kernel to request access to the backing storage for a memory object. Because of the protected nature of this dialog, memory managers do not typically give access to the abstract memory object port to clients. Instead, clients are given access to memory object representatives. A memory object representative is the client's representation of a memory object. There is only one operation permitted against such a port and that is to map the associated memory object into a task's address space. Making such a request initiates a protocol between the mapping kernel and the memory manager to initialize the underlying abstract memory object. It is through this special protocol that the kernel is informed of the abstract memory object represented by the representative, as well as the set of access modes permitted by the representative.

Memory Cache Object

The portion of the kernel's main memory cache that contains the resident pages associated with a given abstract memory object is referred to as the memory cache object. The memory manager for a memory object holds send rights to the kernel's memory cache object. The memory manager is involved in an asynchronous dialog with the kernel to provide the abstraction of its abstract memory object by sending messages to the associated memory cache object.

The operations upon memory cache objects include the following:

Set operational attributes

Return attributes

Supply pages to the kernel

Indicate that pages requested by the kernel are not available

Indicate that pages requested by the kernel should be filled by the kernel's default rules Force delayed copies of the object to be completed Indicate that pages sent to the memory manager have been disposed Restrict access to memory pages Provide performance hints Terminate

Processor

Each physical processor that is capable of executing threads is named by a processor control port. Although significant in that they perform the real work, processors are not very significant in the microkernel, other than as members of a processor set. It is a processor set that forms the basis for the pool of processors used to schedule a set of threads, and that has scheduling attributes associated with it. The operations supported for processors include the following:

Assignment to a processor set Machine control, such as start and stop

Processor Set

Processors are grouped into processor sets. A processor set forms a pool of processors used to schedule the threads assigned to that processor set. A processor set exists as a basis to uniformly control the scheduleability of a set of threads. The concept also provides a way to perform coarse allocation of processors to given activities in the system. The operations supported upon processor sets include the following:

Creation and deletion

Assignment of processors

Assignment of threads and tasks

Scheduling control

Host

Each machine (uniprocessor or multiprocessor) in a networked microkernel system runs its own instantiation of the microkernel. The host multiprocessor 100 is not generally manipulated by client tasks. But, since each host does carry its own microkernel 120, each with its own port space, physical memory and other resources, the executing host is visible and sometimes manipulated directly. Also, each host generates its own statistics. Hosts are named by a name port which is freely distributed and which can be used to obtain information about the host and a control port which is closely held and which can be used to manipulate the host.

Operations supported by hosts include the following:

Clock manipulation

Statistics gathering

Re-boot

Setting the default memory manager

Obtaining lists of processors and processor sets

Clock

A clock provides a representation of the passage of time by incrementing a time value counter at a constant frequency. Each host or node in a multicomputer implements its own set of clocks based upon the various clocks and timers supported by the hardware as well as abstract clocks built upon these timers. The set of clocks implemented by a given system is set at configuration time.

Each clock is named by both a name and a control or privileged port. The control port allows the time and resolution of the clock to be set. Given the name port, a task can perform the following:

Determine the time and resolution of the clock.

Generate a memory object that maps the time value.

Sleep (delay) until a given time.

Request a notification or alarm at a given time.

Tasks and Threads

This section discusses the user visible view of threads and tasks. Threads are the active entities in the Microkernel System 115. They act as points of control within a task, which provides them with a virtual address space and a port name space with which other resources are accessed.

Threads

A thread is the basic computational entity. A thread belongs to only one task that defines its virtual address space. A thread is a lightweight entity with a minimum of state. A thread executes in the way dictated by the hardware, fetching instructions from its task's address space based on the thread's register values. The only actions a thread can take directly are to execute instructions that manipulate its registers and read and write into its memory space. An attempt to execute privileged machine instructions, though, causes an exception. The exception is discussed later. To affect the structure of the address space, or to reference any resource other than the address space, the thread must execute a special trap instruction which causes the kernel to perform operations on behalf of the thread, or to send a message to some agent on behalf of the thread. Also, faults or other illegal instruction behavior cause the kernel to invoke its exception processing.

Tasks

A task can be viewed as a container that holds a set of threads. It contains default values to be applied to its containing threads. Most importantly, it contains those elements that its containing threads need to execute, namely, a port name space and a virtual address space.

IPC

With the exception of its shared memory, a microkernel task interacts with its environment purely by sending messages and receiving replies. These messages are sent using ports. A port is a communication channel that has a single receiver and can have multiple senders. A task holds rights to these ports that specify its ability to send or receive messages.

Ports

A port is a unidirectional communication channel between a client who requests a service and a server who provides the service.

A port has a single receiver and can have multiple senders. A port that represents a kernel supported resource has the kernel as the receiver. A port that names a service provided by a task has that task as the port's receiver. This receivership can change if desired, as discussed under port rights.

The state associated with a port is:

The associated message queue

A count of references or rights to the port

Port right and out-of-line memory receive limits

Message sequence number

Number of send rights created from receive right

Containing port set

Name of no-more-sender port if specified

Virtual Memory Management

The Microkernel's virtual memory design layers the virtual memory system into machine-dependent and machine-independent portions. The machine-dependent portion provides a simple interface for validating, invalidating, and setting the access rights for pages of virtual memory, thereby maintaining the hardware address maps. The machine independent portion provides support for logical address maps (mapping a virtual address space), memory ranges within this map, and the interface to the backing storage (memory objects) for these ranges through the external memory management interface.

The virtual memory system is designed for uniform memory access multiprocessors of a moderate number of processors. Support for architectures providing non-uniform memory access or no remote memory access is currently being investigated. High performance is a feature of the microkernel virtual memory design. Much of this results from its efficient support of large, sparse address spaces, shared memory, and virtual copy memory optimizations. Finally, the virtual memory system allows clients to provide the backing storage for memory ranges, thereby defining the semantics that apply to such ranges.

Reference is made here to the above cited co-pending United States Patent Application by Guy G. Sotomayor, Jr., James M. Magee, and Freeman L. Rawson, III, entitled "METHOD AND APPARATUS FOR MANAGEMENT OF MAPPED AND UNMAPPED REGIONS OF MEMORY IN A MICROKERNEL DATA PROCESSING SYSTEM", which is incorporated herein by reference for its more detailed discussion of these topics.

Part B. Detailed Description of the Invention

The shared memory invention is shown in the series of architectural diagrams in FIGS. 2B through 2I, which illustrate various stages in the organization of the memory 102 for the host multiprocessor 100. In addition, control message 702 and token message 704 are shown in FIGS. 3A and 3B. In conjunction with these figures, the flow diagram 400 of FIGS. 4A, 4B and 4C should be consulted, which illustrates the sequence of operational steps in the method of the invention.

FIG. 2A shows the host multiprocessor 100 with its memory 102 containing a first task T(A) 210 which is defined by the template region 210(T) which specifies the virtual address space 102A and the base address B(A). Reference should be made to the above cited Sotomayor, et al., co-pending patent application, for description of the management of mapped and unmapped regions of a memory in a microkernel data processing system.

Also shown in the memory 102 of FIG. 2A, is a second local task T(B) 210', which is defined by its template region 210'(T), for its virtual address space 102B and its base address B(B). The first task T(A) 210 has a related thread 248 that includes instructions that are executed by the processor A 110. The second task T(B) 210' has a second thread 248' that includes instructions executed by the second processor B 112.

Also included in the memory 102 of FIG. 2A is the I/O task 210" which performs interfacing operations between the host multiprocessor 100 and a remote task T(C), which is located on a second host multiprocessor connected through the I/O adapter/processor 108. The I/O task 210" has an associated I/O buffer 712 and an associated thread 248" which includes instructions which are executed on the I/O processor 108.

The memory 102 also includes the microkernel 120. Contained in the microkernel 120 is the IPC subsystem 122 which includes the look aside buffer 230, message buffer 270, the message passing library 220, and the virtual memory module 124.

An additional template region 712(T) is the template from which the I/O buffer 712 is created in the memory 102.

FIG. 2A shows the organization of the memory 102 during a preliminary stage in the operation of the invention. This is shown by the look aside buffer 230 which does not contain any virtual address values and message buffer 270 does not contain any messages. The message passing library 220 shows that the task T(A) is a local task, the task T(B) is a local task, and the task T(C) is a remote task for which access must be obtained through the I/O task 210" using port (C).

The virtual memory module 124 of FIG. 2A indicates that the template for task T(A) can be found at the base address B(A)'. The template for the task T(B), can be found at the base address B(B)'. The template for the I/O task (not shown) can be found at the base address B(C)'. The template for the I/O buffer can be found at the base address B(I/O)'.

Figure 4A:
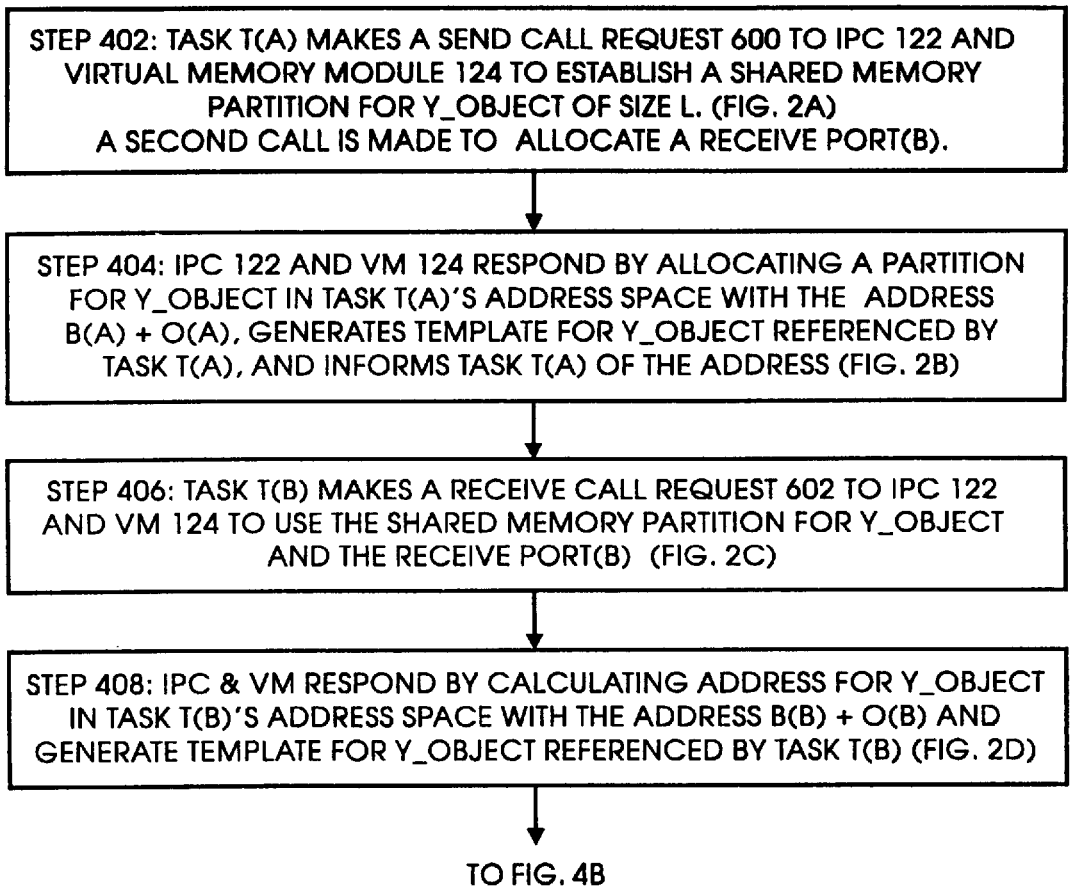

The organization of the memory 102 in FIG. 2A reflects the operation of the first step 402 in the flow diagram 400 of FIG. 4A. Step 402 has the task T(A) make a send call request 600 to the IPC subsystem 122 and virtual memory module 124 in order to establish a shared memory partition for the Y_Object having a size L. A separate call is made to allocate a receive port of port (B). This is indicated by the arrow shown in FIG. 2A directed from the task 210 to the IPC subsystem 122.

Figure 3A:
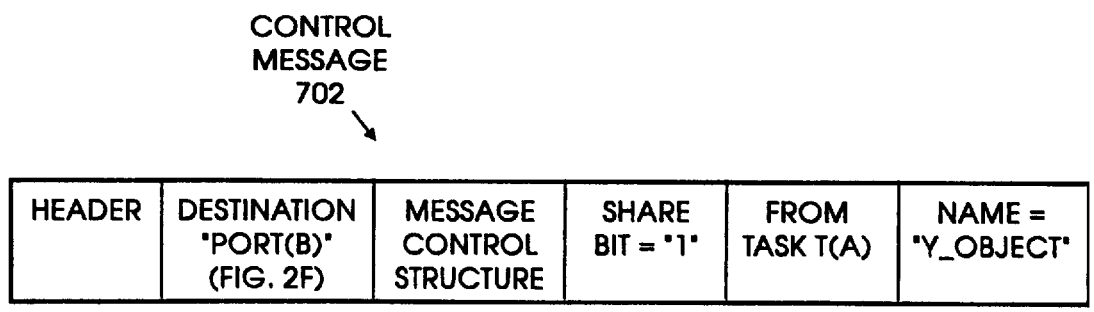
FIGS. 3a and 3b show the control and token messages.
Figure 3B:
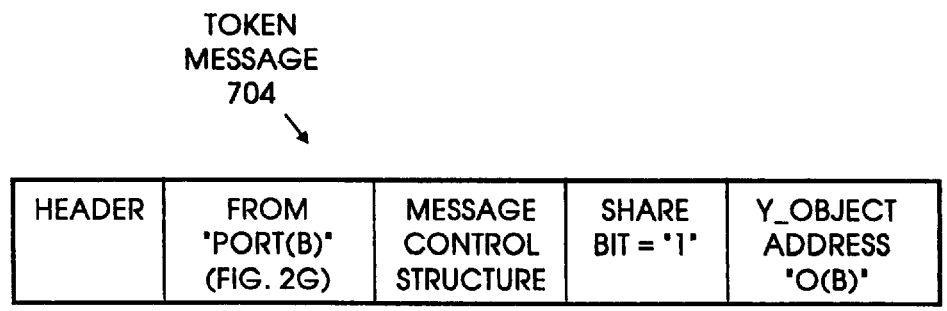

FIG. 2B illustrates the organization of the memory 102 during the step 404 of the flow diagram of FIG. 4A. In step 404, the IPC subsystem 122 and virtual memory module 124 respond by allocating a partition 710 for the Y_Object in the task T(A)'s address space. A master template 710(M) is formed by the microkernel 120, for the purpose of defining the Y_Object 710. The virtual memory module 124 includes a definition of the port B list of tasks which reference the Y_Object 710. The port B list includes the task T(A). As is described more thoroughly in the Sotomayor, et al. patent application cited above, the template for the Y_Object 710(T) is formed as a child object of the master template 710(M). The template for the Y_Object 710(T) includes an offset address value O(A) for the Y_Object 710 in the virtual address space 102A of the task T(A). The virtual address for the Y_Object 710 in the virtual address space 102A, is the base address B(A) provided by the template region 210(T) plus the offset value O(A) provided by the template for the Y_Object 710(T).

Note that in order to obtain the virtual address for the Y_Object 710 in the virtual address space 102A for the task T(A), when beginning at the master template 710(M), it is necessary to follow the pointers 2 and 4 from the master template to the template 710(T) and then to the template region 210(T) for the task T(A). The referencing of the Y_Object 710 by the task T(A) is accomplished by the pointers 3 and 1 from the template region 210(T), through the template for the Y_Object 710(T), to the master template 710(M), respectively. One of the advantages of the invention is the use of the look aside buffer 230 to store the virtual address of the Y_Object in the virtual address space for the task T(A) so that the chain of pointers to and from do not have to be followed each time the virtual address is required.

Reference should be made to the message passing library 220 in FIG. 2B which shows that both task T(A) and task T(B) have the port for accessing the shared object as port (B). The virtual memory module 124 has been updated in FIG. 2B to show that the template for the Y_Object is at the base address B(Y)' and further to provide the port B list which lists task T(A).

FIG. 2C shows the organization of the memory 102 which corresponds to step 406 of the flow diagram of FIG. 4A. In step 406, task T(B) makes a receive call request 602 to the IPC subsystem 122 and virtual memory module 124, to use the shared memory partition 710 for the Y_Object and to have the receive port as port (B). FIG. 2C shows the arrow directed from the task 210' to the IPC subsystem 122 which is the receive call request 602.

Figure 2D:
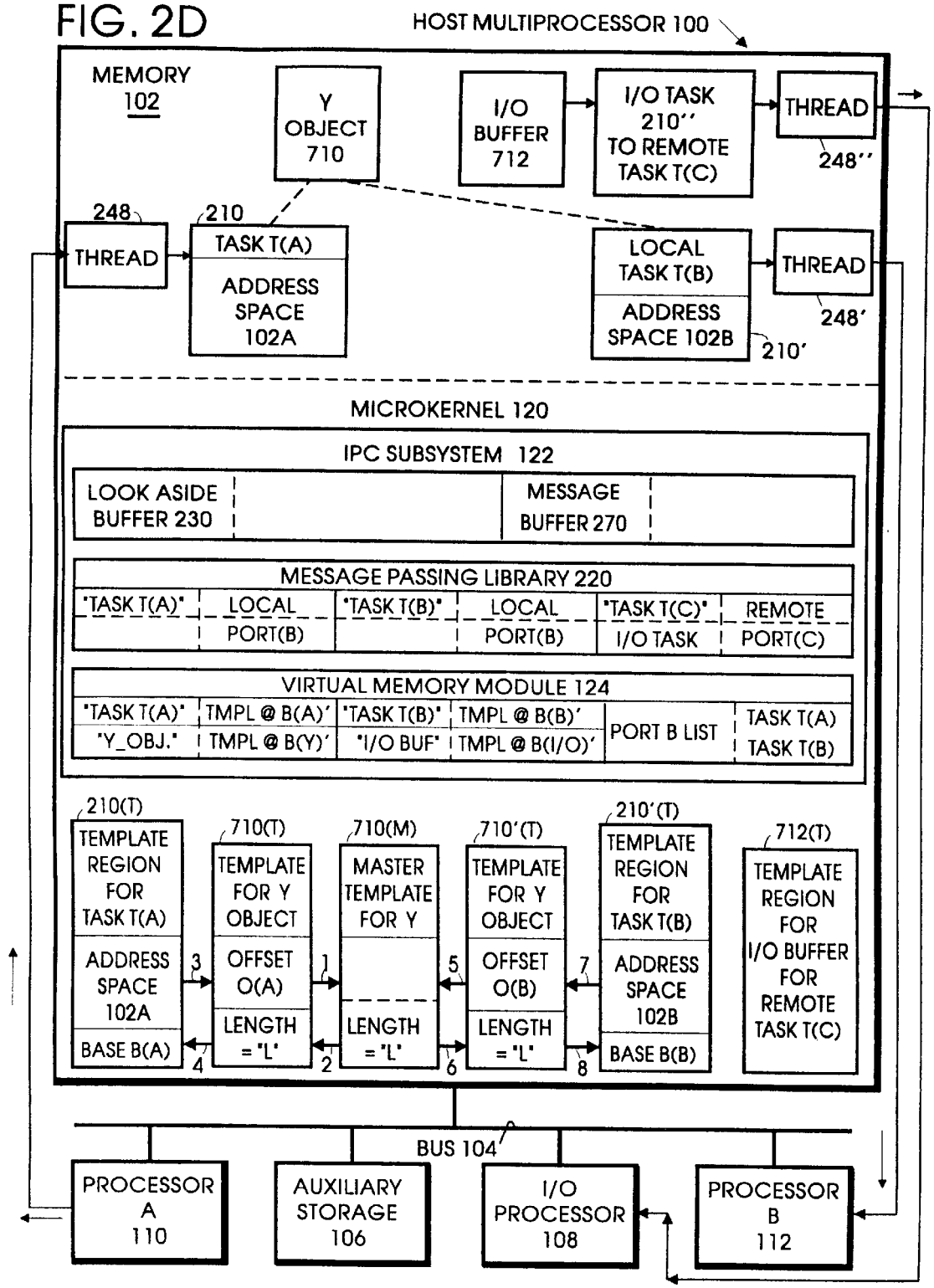
Figure 2E:
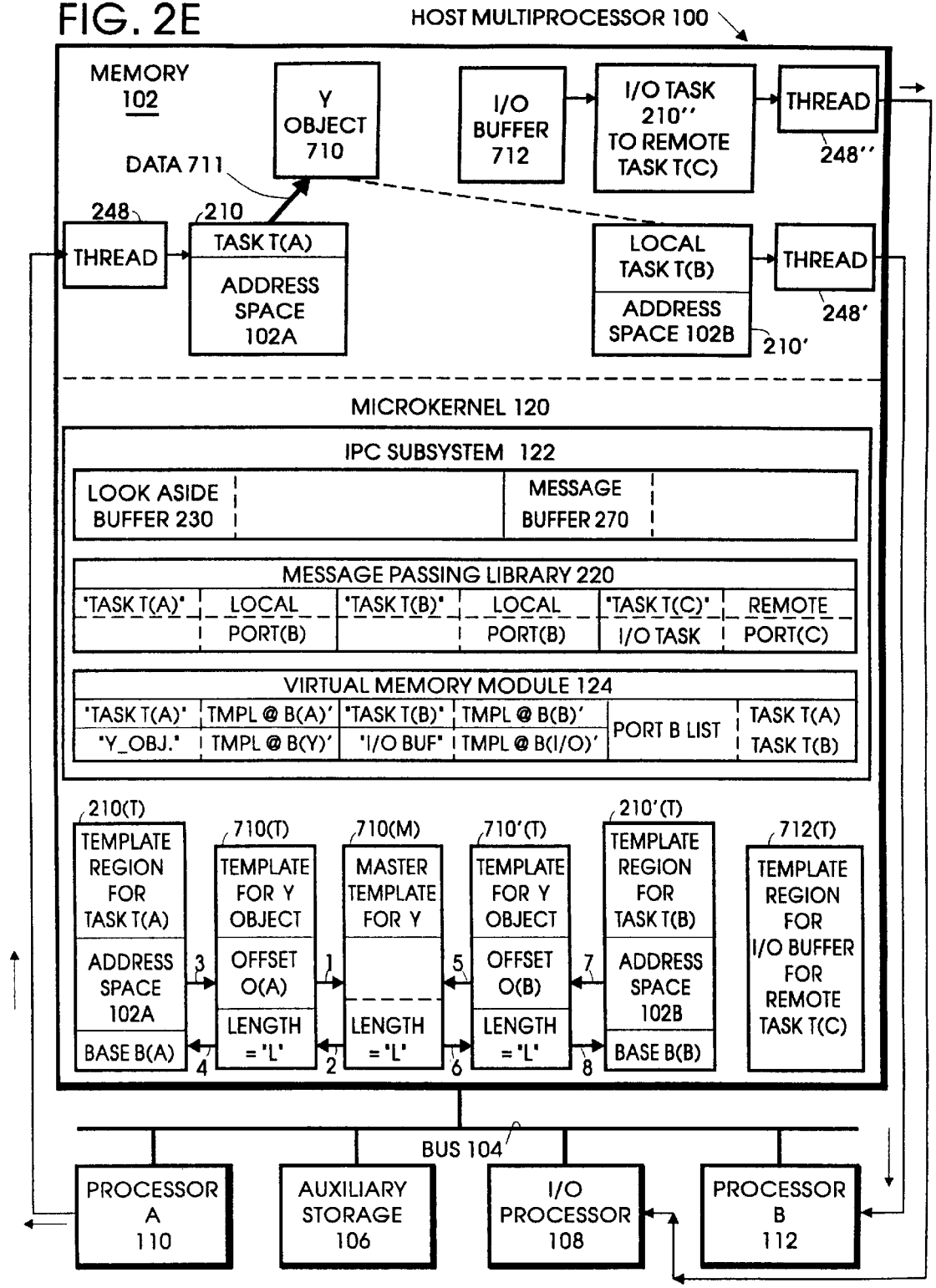

FIG. 2D illustrates the organization of the memory 102 which corresponds to step 408 of the flow diagram of FIG. 4A. Step 408 has the IPC subsystem 122 and virtual memory module 124 responding to step 406, by calculating the virtual address for the Y_Object 710 in the local task T(B)'s virtual address space. The microkernel 120 produces a second daughter object which is the template 710' (T) from the master template 710(M). The template 710'(T) is formed to provide the virtual address for the Y_Object 710 in the task T(B)'s address space 102B. The offset value O(B) is provided in the template 710'(T). When this offset value is added to the base address B(B) for the local task T(B), this provides the virtual address value for the Y_Object 710 in the virtual address space of task T(B). Pointers 6 and 8 relate the master template 710(M) to the template 710'(T) and the task T(B) template 210'(T). Pointers 5 and 7 relate these templates in the reverse direction. The port B list in the virtual memory module 124 now includes both tasks T(A) and task T(B). In order to obtain the virtual address of the Y_Object 710 in the virtual address space for the task T(B), one must begin at the template region 210'(T) for task T(B) and pass through the pointers 7 and 5 to obtain the offset O(B) and the base address B(B). One of the objectives of the invention is to provide a simpler mechanism for obtaining the virtual address by providing it in the look aside buffer 230.

Flow diagram FIG. 4A now transitions to step 410 of FIG. 4B. Step 410 of FIG. 4B corresponds to the memory organization shown in FIG. 2E. In step 410, the memory 102 has been initialized by providing the Y_Object 710 and relating it to task T(A) in its virtual address space 102A and also relating the Y_Object in the virtual address space 102B for task T(B). When task T(A) desires to write data for use by the second task T(B), step 410 has task T(A) write the data 711 into the Y_Object 710 contained within its address space. This is shown by the arrow from task 210 directed to the Y_Object 710 in FIG. 2E.

Figure 2F:
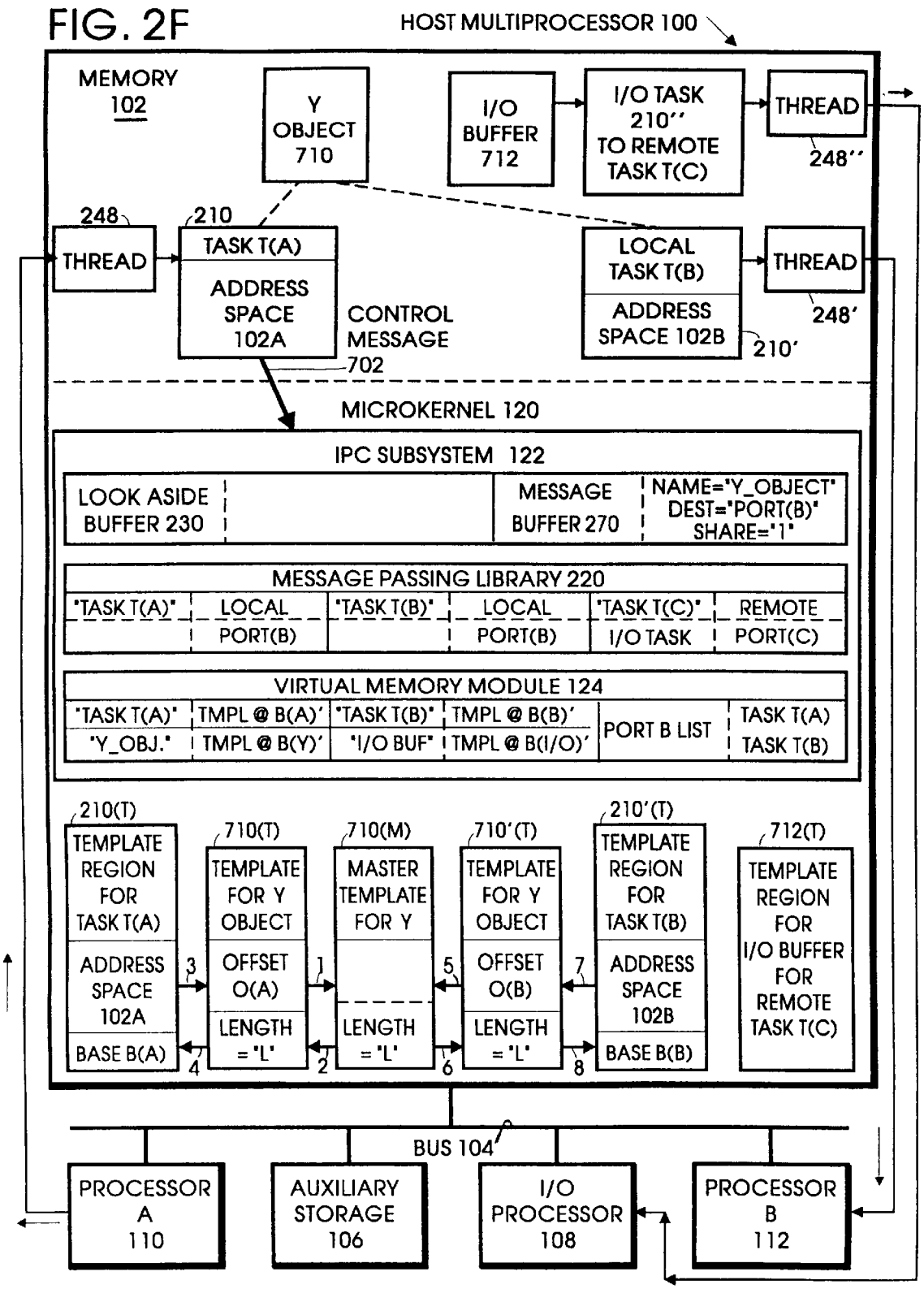
Figure 2H:
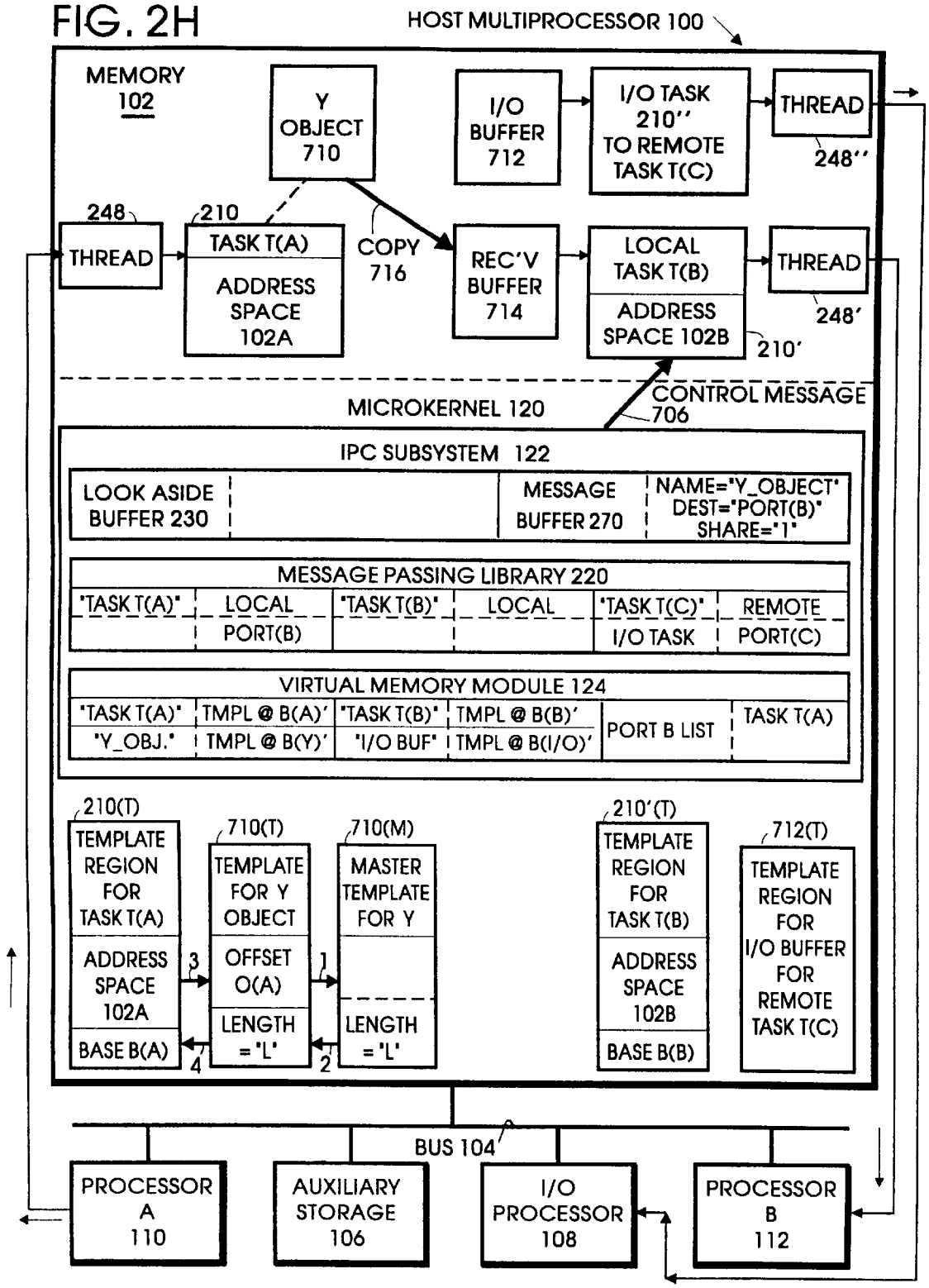

Then step 412 of FIG. 4B has the task T(A) send a control message 702 to the IPC subsystem 122 indicating that it wants to send data in the Y_Object 710 to port (B). This is illustrated in FIG. 2F which shows the arrow directed from the task 210 to the IPC subsystem 122. The format for control message 702 is shown in FIG. 3A, and it is buffered in the message buffer 270.

Step 414 of FIG. 4B has the IPC subsystem 122 determine whether the receive port (B) is for a local or for a remote task. The decision step 415 branches to step 416 if the task is local and alternately it branches to FIG. 4C and step 430 if the task is remote. The IPC subsystem 122 will refer to the message passing library 220 to determine whether a task is local or remote. The control message 702, which is illustrated in FIG. 3A, includes the destination as "port (B)", has the share bit on, gives the name of the shared object as "Y_Object", and indicates that the message 702 is from task T(A). The virtual memory module 124 provides the port B list, which includes task T(A) and task T(B). Since the message came from task T(A), then it is task T(B) which is the intended destination task. Task T(B) is listed in the message passing library 220 as being local, and therefore step 415 of FIG. 4B branches to step 416.

In step 416, the IPC subsystem 122 determines whether the Y_Object 710 is in a shared memory partition. Step 417 will branch to step 418 if the Y_Object is shared whereas step 417 will branch to FIG. 4D and step 432 if the Y_Object is not shared.

Then step 418 has the IPC subsystem 122 determining whether the Y_Object is already referenced in the look aside buffer 230. Step 419 branches to step 420 if the Y_Object is already referenced, or as step 419 branches to FIG. 4E and step 424 if it is not referenced. In this example, for first pass by the task T(A) in performing a shared message transfer to task T(B), the look aside buffer 230 is empty. Therefore, in step 424, the IPC subsystem 122 looks for any destination task names in the port B list and gets the Y_Object's address in task T(B)'s address space. To perform this step, the IPC subsystem 122 locates the template 210'(T) for the task T(B), and follows the pointers 7 and 5 to the Y_Object template in order to gather the offset value O(B) and the base address value B(B) in order to obtain the virtual address for the Y_Object 710 in the virtual address base 102(B) for the task T(B). Step 426 then has the IPC subsystem 122 write into the look aside buffer 230, the virtual address of the Y_Object 710 and task T(B)'s address space 102B. This can be seen in the memory organization in FIG. 2G, where the value for the Y_Object virtual address in task B is stored in the look aside buffer 230. Step 426 then sends a token message 704 to task T(B) that indicates that task T(B) has a message available to it at the address which is the virtual address for the Y_Object 710. This is indicated by the arrow in FIG. 2G from the IPC subsystem 122 directed to the task T(B). The format for token message 704 is shown in FIG. 3B.

Step 428 of FIG. 4E has the task T(B) use the data in the Y_Object 710 without the need to recopy the data. This provides substantial performance advantages over recopying the data into a receive buffer for the task T(B).

Reference can now be made to FIG. 4D which shows the flow diagram 400 after step 417 has determined that task T(B) does not share the Y_Object 710. Then in step 432, the IPC subsystem 122 makes a copy of the data 711 from the Y_Object 710, as is shown by the arrow 716 in FIG. 2H. The copy 716 of the data from the Y_Object is placed into the receive buffer 714 for the local task T(B). Then the IPC subsystem 122 sends a control message 706 to the local task T(B), informing it that data in a message has been written into the receive buffer 714. It can be seen that the necessity to recopy the data 711 has imposed a performance penalty over the operation of the invention when the Y_Object 710 is actually shared between task T(A) and task T(B).

Reference can now be made to FIG. 4C which shows the flow diagram 400 after step 415 has determined that the destination task is actually a remote task not co-located in the host multiprocessor 100. In this example, if the intended destination is to port (C) for task T(C), this task T(C) is located in another memory of another host multiprocessor (not shown), which is coupled to the multiprocessor 100 by means of the I/O processor 108. Step 430 has the IPC subsystem 122 make a copy 718 of the data 711 from the Y_Object 710, as is shown in FIG. 2I. The copy is placed in the I/O buffer 712 for the I/O task 210". The I/O task 210" operates with a thread 248" which is executed in the I/O processor 108 to carry out exchanges of data between the I/O buffer 712 and the I/O processor 108 which is connected by means of a link to a non-local multi-processor which is host to the destination task T(C). The step 430 then has the IPC subsystem 122 send a control message 708 to the I/O task 210", which notifies the I/O task 210" to transmit the contents of the I/O buffer 712, by means of the I/O processor 108, to the remote multiprocessor host and the remote task T(C).

Figure 5A:
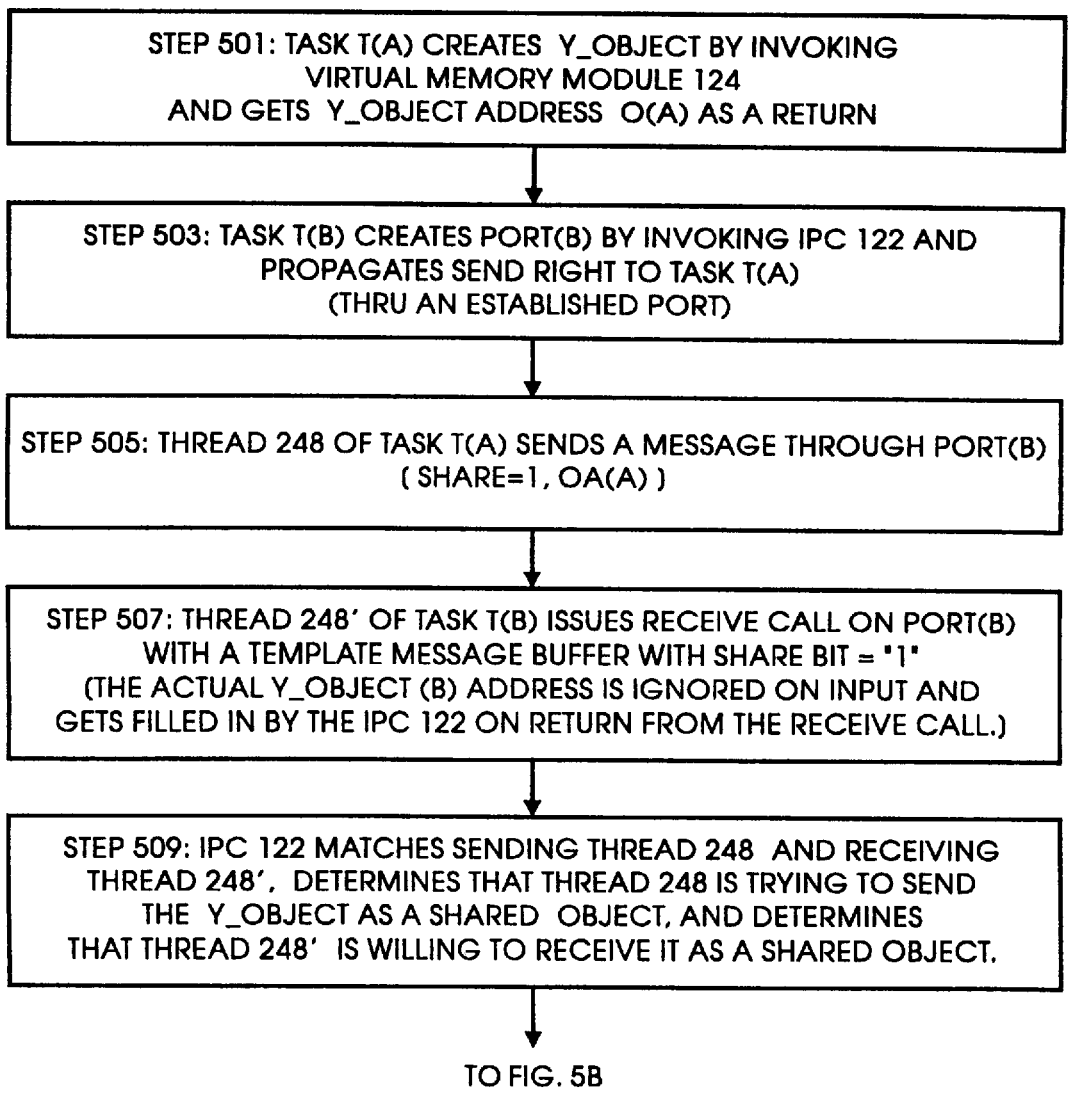
FIGS. 5A and 5B show diagram representing the best mode embodiment of the method of the invention.
Figure 5B:
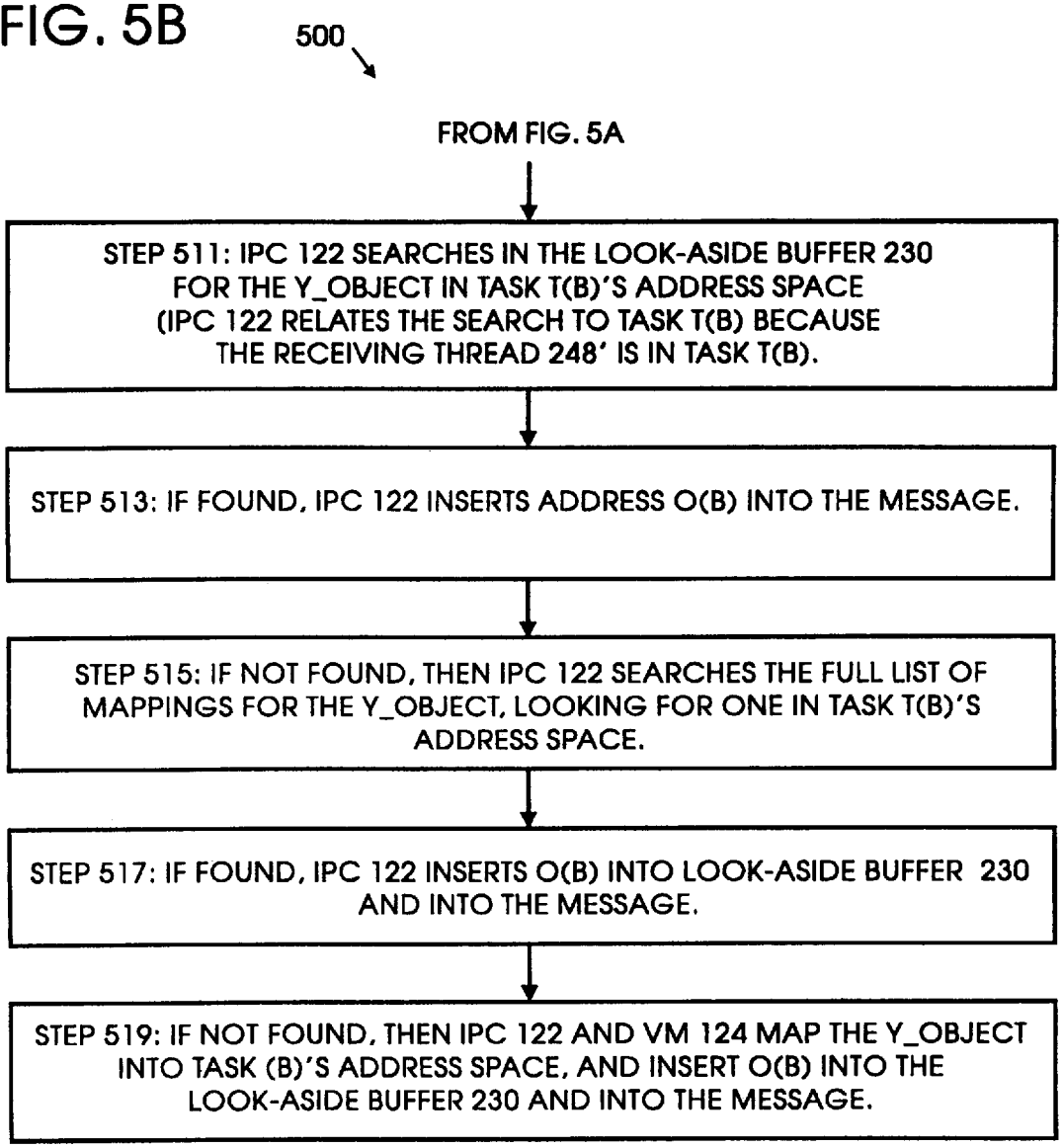

FIGS. 5A and 5B show the flow diagram 500 for the embodiment of the method of the invention, which represents the best mode of the invention. The method begins with step 501 which corresponds to step 402 of the flow diagram in FIG. 4A.

Step 501: Task T(A) creates Y_Object by invoking virtual memory module 124 and gets Y_Object address O(A) as a return.

Step 503: Task T(B) creates port (B) by invoking IPC 122 and propagates send right to task T(A) (through and established port).

Step 505: Thread 248 of task T(A) sends a message through port (B) (share=1, OA(A)).

Step 507: Thread 248' of task T(B) issues receive call on port (B) with a template message buffer with share bit - "1" (the actual Y_Object (B) address is ignored on input and gets filled-in by the IPC 122 on return from the receive call).

Step 509: IPC 122 matches sending thread 248 and receiving thread 248', determines that thread 248 is trying to send the Y_Object as a shared object, and determines that thread 248' is willing to receive it as a shared object.

Step 511: IPC 122 searches in the look-aside buffer 230 for the Y_Object in task T(B)'s address space (IPC 122 relates the search to task T(B) because the receiving thread 248' is in task T(B)).

Step 513: If found, IPC 122 inserts address O(B) into the message.

Step 515: If not found, then IPC 122 searches the full list of mappings for the Y_Object, looking for one in task T(B)'s address space.

Step 517: If found, IPC 122 inserts O(B) into look-aside buffer 230 and into message.

Step 519: If not found, then IPC 122 and VM 124 map the Y_Object into task (B)'s address space, and insert O(B) into the look-aside buffer 230 and into the message.

It can be seen that, in accordance with the invention, the shared memory system and process will adaptively provide performance enhancements with the shared memory operation for local tasks that exchange data and have provided for the sharing of a common memory object such as the Y_Object 710. Furthermore, it is seen that the system and method of the shared memory invention will adaptively provide for the copying of data from the Y_Object if it is determined that the destination task is not a local task but is in fact a remote task not co-located with the sending task in the same memory space.

Although a specific embodiment of the invention has been disclosed, it will be understood by those having skill in the art that changes can be made to that specific embodiment without parting from the spirit and scope of the invention.

What is claimed is:

1. In a data processing system, including a processor for executing stored program instructions and a memory for storing program instructions describing a first task and thread and a second task and thread, a method for sharing a partition of the memory between the first task and the thread and the second task and thread, comprising;

transferring a send call request from the first task and thread to an interprocess communications controller in the memory, to allocate a shared partition of the memory;

transferring a receive call request from the second task and thread to the interprocess communications controller, to share the shared partition;

writing data from the first task and thread to the shared partition;

transferring a control message from the first task and thread to the interprocess communications controller, to give notice of the data transferred to the shared partition;

first checking in the interprocess communications controller whether the second task and thread are local or remote;

second checking in the interprocess communications controller whether the second task and thread share the shared partition with the first task and thread;

writing an address for said shared partition in a look aside buffer; and transferring a token message from the interprocess communications controller to the second task and thread to give notice of the data available in the shared partition.

2. The method of claim 1, which further comprises:

copying the data from said shared partition to an I/O buffer in the memory if said first checking step fails.

3. In a data processing system, including a a processor for executing stored program instructions and a memory for storing program instructions describing a first task and thread and a second task and thread, a method for sharing a partition of the memory between the first task and the thread and the second task and thread, comprising;

transferring a send call request from the first task and thread to an interprocess communications controller in the memory, to allocate a shared partition of the memory;

transferring a receive call request from the second task and thread to the interprocess communications controller, to share the shared partition;

writing data from the first task and thread to the shared partition;

transferring a control message from the first task and thread to the interprocess communications controller, to give notice of the data transferred to the shared partition;

first checking in the interprocess communications controller whether the second task and thread are local or remote;

second checking in the interprocess communications controller whether the second task and thread share the shared partition with the first task and thread;

writing an address for said shared partition in a look aside buffer;

transferring a token message from the interprocess communications controller to the second task and thread to give notice of the data available in the shared partition;

copying the data from said shared partition to an I/O buffer in the memory if said first checking step fails; and copying said data from the shared partition to a receive buffer of the second task and thread if said second checking step fails.

4. The method of claim 1, which further comprises:

checking said look aside buffer during a subsequent transfer of data from said shared partition; and transferring a subsequent message if said address for said shared partition is stored in the look aside buffer.

5. A data processing system, comprising:

a processor for executing stored program instructions;

a bus means coupled to the processor for transferring information signals to and from the processor;

a memory coupled to the bus means for storing program instructions which describe a first task and thread and a second task and thread;

an interprocess communications means in said memory, for accepting a send call request from the first task and thread, for allocating a shared partition in the memory;

said interprocess communications means further accepting a receive call request from the second task and thread, for sharing the shared partition;

said first task and thread writing data into said shared partition;

said interprocess communications means further accepting a control message from the first task and thread, to give notice of the data transferred to the shared partition;

said interprocess communications means first checking whether the second task and thread are local or remote, then second checking whether the second task and thread share the shared partition with the first task and thread;

a look aside buffer in said memory, for accepting a virtual address value written by said interprocess communications means, representing a virtual address of said shared partition in a virtual address space of said second task; and said interprocess communications means transferring a token message to the second task and thread to give notice of the data available in the shared partition.

6. The system of claim 5, which further comprises:

said interprocess communications means copying the data from said shared partition to an I/O buffer in the memory if said first checking step fails.

7. A data processing system, comprising:

a processor for executing stored program instructions;

a bus means coupled to the processor for transferring information signals to and from the processor;

a memory coupled to the bus means for storing program instructions which describe a first task and thread and a second task and thread;

an interprocess communications means in said memory, for accepting a send call request from the first task and thread, for allocating a shared partition in the memory;

said interprocess communications means further accepting a receive call request from the second task and thread, for sharing the shared partition;

said first task and thread writing data into said shared partition;

said interprocess communications means further accepting a control message from the first task and thread, to give notice of the data transferred to the shared partition;

said interprocess communications means first checking whether the second task and thread are local or remote, then second checking whether the second task and thread share the shared partition with the first task and thread;

a look aside buffer in said memory, for accepting a virtual address value written by said interprocess communications means, representing a virtual address of said shared partition in a virtual address space of said second task;

said interprocess communications means transferring a token message to the second task and thread to give notice of the data available in the shared partition;

said interprocess communications means copying the data from said shared partition to an I/O buffer in the memory if said first checking step fails; and said interprocess communications means copying said data from the shared partition to a receive buffer of the second task and thread if said second checking step fails.

8. The system of claim 5, which further comprises:

said interprocess communications means checking said look aside buffer during a subsequent transfer of data from said shared partition and transferring a subsequent token message if said address for said shared partition is stored in the look aside buffer.

9. In a data processing system, including a processor for executing stored program instructions and a memory for storing program instructions describing a first task and thread and a second task and thread, a method for sharing a partition of the memory between the first task and the thread and the second task and thread, comprising;

transferring a send request from the first task and thread to an interprocess communications controller in the memory, to allocate a shared partition of the memory;

transferring a receive request from the second task and thread to the interprocess communications controller, to share the shared partition;

writing data from the first task and thread to the shared partition;

transferring a first control message from the first task and thread to the interprocess communications controller, to give notice of the data transferred to the shared partition;

transferring a second control message from the second task and thread to the interprocess communications controller, to indicate availability to receive data int he shared partition;

writing an address for said shared partition in a look aside buffer; and transferring a token message from the interprocess communications controller to the second task and thread to give notice of the data available in the shared partition.

10. The method of claim 9, which further comprises:

checking said look aside buffer during a subsequent transfer of data from said shared partition; and transferring a subsequent message if said address for said shared partition is stored in the look aside buffer.

11. A data processing system, comprising:

a processor for executing stored program instructions;

a bus means coupled to the processor for transferring information signals to and from the processor;

a memory coupled to the bus means for storing program instructions which describe a first task and thread and a second task and thread;

an interprocess communications means in said memory, for accepting a send request from the first task and thread, for allocating a shared partition in the memory;

said interprocess communications means further accepting a receive request from the second task and thread, for sharing the shared partition;

said first task and thread writing data into said shared partition;

said interprocess communications means further accepting a control message from the first task and thread, to give notice of the data transferred to the shared partition;

a look aside buffer in said memory, for accepting a virtual address value written by said interprocess communications means, representing a virtual address of said shared partition in a virtual address space of said second task; and said interprocess communications means transferring a token message to the second task and thread to give notice of the data available in the shared partition.

12. The system of claim 11, which further comprises:

said interprocess communications means checking said look aside buffer during a subsequent transfer of data from said shared partition and transferring a subsequent token message if said address for said shared partition is stored in the look aside buffer.

13. An article of manufacture for use in a data processing system, including a processor for executing stored program instructions and a memory for storing program instructions describing a first task and thread and a second task and thread, comprising:

a computer useable medium having a computer readable program code means embodied therein for sharing a partition of the memory between the first task and the thread and the second task and thread, the computer readable program code means in said article of manufacture comprising:

computer readable program code means for causing a computer to transfer a send call request from the first task and thread to an interprocess communications controller in the memory, to allocate a shared partition of the memory;

computer readable program code means for causing a computer to transfer a receive call request from the second task and thread to the interprocess communications controller, to share the shared partition;

computer readable program code means for causing a computer to write data from the first task and thread to the shared partition;

computer readable program code means for causing a computer to transfer a control message from the first task and thread to the interprocess communications controller, to give notice of the data transferred to the shared partition;

computer readable program code means for causing a computer to first check in the interprocess communications controller whether the second task and thread are local or remote;

computer readable program code means for causing a computer to second check in the interprocess communications controller whether the second task and thread share the shared partition with the first task and thread;

computer readable program code means for causing a computr to write an address for said shared partition in a look aside buffer; and computer readable program code means for causing a computer to transfer a token message from the interprocess communications controller to the second task and thread to give notice of the data available in the shared partition.

14. The article of manufacture for use in a computer system of claim 13, which further comprises:

computer readable program code means for causing a computer to copy the data from said shared partition to an I/O buffer in the memory if said first checking step fails.

15. An article of manufacture for use in a data processing system, including a processor for executing stored program instructions and a memory for storing program instructions describing a first task and thread and a second task and thread, comprising:

a computer useable medium having a computer readable program code means embodied therein for sharing a partition of the memory between the first task and the thread and the second task and thread, the computer readable program code means in said article of manufacture comprising:

computer readable program code means for causing a computer to transfer a send call request from the first task and thread to an interprocess communications controller in the memory, to allocate a shared partition of the memory;

computer readable program code means for causing a computer to transfer a receive call request from the second task and thread to the interprocess communications controller, to share the shared partition;

computer readable program code means for causing a computer to write data from the first task and thread to the shared partition;

computer readable program code means for causing a computer to transfer a control message from the first task and thread to the interprocess communications controller, to give notice of the data transferred to the shared partition;

computer readable program code means for causing a computer to first check in the interprocess communications controller whether the second task and thread are local or remote;

computer readable program code means for causing a computer to second check in the interprocess communications controller whether the second task and thread share the shared partition with the first task and thread;

computer readable program code means for causing a computr to write an address for said shared partition in a look aside buffer;

computer readable program code means for causing a computer to transfer a token message from the interprocess communications controller to the second task and thread to give notice of the data available in the shared partition;

computer readable program code means for causing a computer to copy the data from said shared partition to an I/O buffer in the memory if said first checking step fails; and computer readable program code means for causing a computer to copy said data from the shared partition to a receive buffer of the second task and thread if said second checking step fails.

16. The article of manufacture for use in a computer system of claim 13, which further comprises:

computer readable program code means for causing a computer to check said look aside buffer during a subsequent transfer of data from said shared partition; and computer readable program code means for causing a computer to transfer a subsequent message if said address for said shared partition is stored in the look aside buffer.

17. An article of manufacture for use in a data processing system, including a processor for executing stored program instructions and a memory for storing program instructions describing a first task and thread and a second task and thread, comprising:

a computer useable medium having computer readable program code means embodied therein for sharing a partition of the memory between the first task and the thread and the second task and thread, the computer readable program code means in said article of manufacture comprising:

computer readable program code means for causing a computer to transfer a send request from the first task and thread to an interprocess communications controller in the memory, to allocate a shared partition of the memory;

computer readable program code means for causing a computer to transfer a receive request from the second task and thread to the interprocess communications controller, to share the shared partition;

computer readable program code means for causing a computer to write data from the first task and thread to the shared partition;

computer readable program code means for causing a computer to transfer a first control message from the first task and thread to the interprocess communications controller, to give notice of the data transferred to the shared partition;

computer readable program code means for causing a computer to transfer a second control message from the second task and thread to the interprocess communications controller, to indicate availability to receive data int he shared partition;

computer readable program code means for causing a computer to write an address for said shared partition in a look aside buffer; and computer readable program code means for causing a computer to transfer a token message from the interprocess communications controller to the second task and thread to give notice of the data available in the shared partition.

18. The article of manufacture for use in a computer system of claim 17, which further comprises:

computer readable program code means for causing a computer to check said look aside buffer during a subsequent transfer of data from said shared partition; and computer readable program code means for causing a computer to transfer a subsequent message if said address for said shared partition is stored in the look aside buffer.

* * * * *